US012804509B2

(12) United States Patent
Tang et al.

(10) Patent No.: US 12,804,509 B2
(45) Date of Patent: Nov. 17, 2026

(54) METHOD AND APPARATUS FOR INTERFACE MANAGEMENT

(71) Applicant: Samsung Electronics Co., Ltd., Suwon-si (KR)

(72) Inventors: Cuiwei Tang, Beijing (CN); Di Su, Beijing (CN); Chen Qian, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 235 days.

(21) Appl. No.: 18/599,011

(22) Filed: Mar. 7, 2024

(65) Prior Publication Data

US 2024/0357466 A1 Oct. 24, 2024

(30) Foreign Application Priority Data

Apr. 18, 2023 (CN) ......................... 202310417006.8
Jul. 3, 2023 (CN) ......................... 202310807537.8
Nov. 3, 2023 (CN) ......................... 202311459367.5

(51) Int. Cl.
*H04W 40/16* (2009.01)
*H04B 17/345* (2015.01)
*H04W 24/08* (2009.01)

(52) U.S. Cl.
CPC .......... *H04W 40/16* (2013.01); *H04B 17/345* (2015.01); *H04W 24/08* (2013.01)

(58) Field of Classification Search
CPC ... H04L 5/0048; H04L 5/0032; H04L 5/0051; H04L 5/006; H04L 5/0073; H04L 5/0094;
(Continued)

(56) References Cited

U.S. PATENT DOCUMENTS

2012/0201190 A1* 8/2012 Sawai .................. H04W 16/26 370/315
2014/0128115 A1 5/2014 Siomina et al.
(Continued)

FOREIGN PATENT DOCUMENTS

WO 2022029197 A1 2/2022

OTHER PUBLICATIONS

International Search Report and Written Opinion of the International Searching Authority dated May 31, 2024, in connection with International Application No. PCT/KR2024/002297, 8 pages.
(Continued)

*Primary Examiner* — Rushil P. Sampat

(57) ABSTRACT

The present disclosure relates to a 5G communication system or a 6G communication system for supporting higher data rates beyond a 4G communication system such as long term evolution (LTE). The present disclosure provides a method performed by a first node in a wireless communication system including: acquiring first information on a first interference to a first terminal, and second information related to node(s) associated with the first node; determining interfering base station related information and interference management related information based on the first information and the second information, wherein the first interference is formed by forwarding a signal sent from an interfering base station by a second node; sending the interference management related information to the second base station and/or the interfering base station, wherein the second base station is a base station of a serving cell of the second node.

20 Claims, 33 Drawing Sheets

(58) Field of Classification Search
CPC .... H04L 5/0023; H04W 24/10; H04B 17/336; H04B 7/0626; H04B 7/088; H04J 11/005; H04J 11/0056
See application file for complete search history.

(56) References Cited

U.S. PATENT DOCUMENTS

| | | | | |
|---|---|---|---|---|
| 2014/0220963 | A1* | 8/2014 | Jung | H04W 24/10 455/422.1 |
| 2016/0044689 | A1* | 2/2016 | Wen | H04W 72/541 370/330 |
| 2016/0119907 | A1 | 4/2016 | Seo et al. | |
| 2016/0285602 | A1 | 9/2016 | Fang | |
| 2017/0303156 | A1* | 10/2017 | Kimura | H04J 11/0036 |
| 2019/0363780 | A1 | 11/2019 | Kahtava et al. | |
| 2020/0169341 | A1* | 5/2020 | Hwang | H04B 17/327 |
| 2023/0035449 | A1* | 2/2023 | Ryu | H04B 7/088 |

OTHER PUBLICATIONS

Supplementary European Search Report dated Jun. 9, 2026, in connection with European Patent Application No. 24792813.8, 17 pages.

* cited by examiner

METHOD AND APPARATUS FOR INTERFACE MANAGEMENT

CROSS-REFERENCE TO RELATED APPLICATIONS

This application is based on and claims priority under 35 U.S.C. § 119 to Chinese Patent Application No. 202310417006.8, filed on Apr. 18, 2023, Chinese Patent Application No. 202310807537.8, filed on Jul. 3, 2023, and Chinese Patent Application No. 202311459367.5, filed on Nov. 3, 2023, all filed in the Chinese Intellectual Property Office, the disclosures of which are incorporated by reference herein in their entirety.

BACKGROUND

1. Field

The embodiments of the present disclosure relate to a wireless communication system, and more particularly, to a node in a wireless communication system and a method performed thereby.

2. Description of Related Art

Considering the development of wireless communication from generation to generation, the technologies have been developed mainly for services targeting humans, such as voice calls, multimedia services, and data services. Following the commercialization of 5th generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, Radio Frequency (RF) elements, antennas, novel waveforms having a better coverage than Orthogonal Frequency Division Multiplexing (OFDM), beamforming and massive Multiple-input Multiple-Output (MIMO), Full Dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, Orbital Angular Momentum (OAM), and Reconfigurable Intelligent Surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, High-Altitude Platform Stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of Artificial Intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as Mobile Edge Computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended Reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

SUMMARY

Currently, there are needs to enhance method and apparatus in a wireless communication system.

Various embodiments of the present disclosure provides a method performed by a first node in a wireless communication system, comprising: acquiring first information on a first interference to a first terminal, and second information related to node(s) associated with the first node; determining interfering base station related information and interference management related information based on the first information and the second information, wherein the first interference is formed by forwarding a signal sent from an interfering base station by a second node; sending the interference management related information to the second base station and/or the interfering base station, wherein the second base station is a base station of a serving cell of the second node.

Optionally, the node associated with the first node includes at least one of: the second node, a first base station, the second base station, at least one third base station, wherein the first base station is a base station of a serving cell of the first terminal, the third base station is other base station managed by the first node than the first base station, or a base station managed by other node connected with the first node, and the at least one third base station includes the interfering base station.

Optionally, the first information includes at least one of the following information: identification information of a first base station, information related to downlink beams sent by the first base station and received by the first terminal, information related to a distance between the first terminal and the first base station, and information related to quality of signals received by the first terminal; wherein the first base station is a base station of a serving cell of the first terminal.

Optionally, the second information includes at least one of the following information: information related to physical position and information related to physical state of the node associated with the first node, codebook related information of the second node, and physical state adjustment related information of the second node.

Optionally, acquiring the second information comprises at least one of the following steps: acquiring information related to the node associated with the first node from the node; acquiring information of the other node from the node associated with the first node.

Optionally, determining interfering base station related information based on the first information and the second information comprises: estimating a spatial position of the first terminal based on the first information; determining a transmission path for a signal from the third base station and forwarded by the second node, based on the second information; determining that the third base station is the interfering base station for the first terminal, when the transmission path for the signal passes through the first terminal.

Optionally, determining whether the at least one third base station is the interfering base station based on a ranking of distance between each of the at least one third base station and the first terminal.

Optionally, the method further comprises: acquiring information related to a first measurement by the first terminal of a first signal sent from the third base station, and determining whether the third base station is the interfering base station for the first terminal based on the information related to the first measurement; or receiving first indication information for indicating whether the third base station is the interfering base station for the first terminal, wherein whether the third base station is the interfering base station for the first terminal is determined based on the information related to the first measurement by the first terminal on the first signal sent from the third base station; or acquiring information related to a second measurement by the third base station of a second signal sent from the first terminal, and determining whether the third base station is the interfering base station for the first terminal based on the information related to the second measurement; or receiving second indication information for indicating whether the third base station is the interfering base station for the first terminal, wherein whether the third base station is the interfering base station for the first terminal is determined based on the information related to the second measurement by the third base station on the second signal sent from the first terminal.

Optionally, the method further comprises: configuring the first terminal to send the first signal to the third base station through the first base station, and/or configuring the third base station to measure the first signal; or configuring the third base station to send the second signal to the first terminal, and/or configuring the first terminal to measure the second signal through the first base station.

Optionally, sending the interference management related information to the interfering base station comprises at least one of: configuring a beam identification ID of the interfering base station corresponding to the first interference, and third indication information for indicating the interfering base station not to send downlink signals on configured beam ID; or configuring a beam identification ID of the interfering base station corresponding to the first interference, and fourth indication information for indicating the interfering base station to reduce transmission power for sending downlink signals on configured beam ID.

Optionally, sending the interference management related information to the second node comprises: configuring at least one of physical position adjustment related information and codebook indication information for the second node through the second base station.

Optionally, sending the interference management related information to the second node comprises: in case that the first node is not a base station of a serving cell of the second node (or a terminal function entity of the second node), sending the interference management related information to the base station of the serving cell of the second node (or the terminal function entity of the second node) by the first node; or in case that the first node is the base station of the serving cell of the second node (or the terminal function entity of the second node), sending the interference management related information to the base station of the serving cell of the second node (or the terminal function entity of the second node) by the first node.

Optionally, in case that the first node is not the base station of the serving cell of the second node (or the terminal function entity of the second node), sending the interference management related information to the second node (or the terminal function entity of the second node) by the base station of the serving cell of the second node (or the terminal function entity of the second node) after it receives the interference management related information. Optionally, the method further comprises: acquiring an updated codebook for a second node to perform assistance communication for a terminal through the second node, wherein the updated codebook is determined based on the physical position adjustment related information.

Optionally, the interference management related information is sent to the interfering base station first, and then the interference management related information is sent to the second base station after receiving indication information fed back by the interfering base station for indicating that the interference management related information is rejected.

Various embodiments of the present disclosure provide a method performed by a first terminal in a wireless communication system, comprising: performing measurement on a received signal; reporting a measurement result to a first base station, wherein first information is obtained based on the measurement result, and the first information is used to determine interfering base station related information and interference management related information on a first interference to the first terminal, and the first base station is a base station of a serving cell of the first terminal.

Optionally, the method further comprises: sending a first signal to a third base station, wherein the first signal is used for being measured by the third base station, and whether the third base station is an interfering base station for the first terminal is determined based on a measurement result of the first signal; or receiving a second signal from a third base station and performing measurement on the second signal, wherein whether the third base station is the interfering base station for the first terminal is determined based on a measurement result of the second signal.

Optionally, the method further comprises: sending first indication information to the first base station for indicating whether the third base station is the interfering base station for the first terminal; or sending the measurement result of the second signal to the first base station.

Optionally, the method further comprises: in response to configuration of a first node through the first base station, performing at least one of the following operations: sending the first signal to the third base station, receiving the second signal from the third base station and measuring the second signal, and reporting the measurement result of the second signal to the first base station.

Various embodiments of the present disclosure provide a method performed by a first base station in a wireless communication system, comprising: receiving a measurement result reported by a first terminal, wherein the measurement result is measured based on a signal received by the first terminal; acquiring first information on a first interference to a first terminal based on the measurement result, wherein the first interference is formed by forwarding a signal of an interfering base station by a second node; sending the first information to a first node, wherein the first information is used to determine interfering base station related information and interference management related information on the first interference.

Optionally, the method further comprises: in response to configuration of the first node, configuring the first terminal to send a first signal to a third base station, and/or configuring the first terminal to measure a second signal received from a third base station, wherein the third base station is other base station managed by the first node than the first base station, or a base station managed by other node connected with the first node, and the third base station includes the interfering base station.

Optionally, the method further comprises: receiving first indication information from the first terminal for indicating whether the third base station is an interfering base station for the first terminal; or receiving the measurement result of the second signal from the first terminal.

Various embodiments of the present disclosure provide a method performed by a second base station in a wireless communication system, comprising: sending second information related to a second base station and a second node to a first node, wherein the second information is used to determine interfering base station related information and interference management related information on a first interference to a first terminal, and wherein the first interference is formed by forwarding a signal of an interfering base station by the second node, and the second base station is a base station of a serving cell of the second node; configuring physical position adjustment related information and/or codebook update related information for the second node, after receiving the interference management related information from the first node.

Optionally, the method further comprises: sending the codebook update related information to the first node.

Various embodiments of the present disclosure provide a method performed by a third base station in a wireless communication system, comprising: receiving interference management related information from a first node, wherein the interference management related information is determined by the first node based on first information and second information, the first information is information on a first interference suffered by a first terminal, the second information is information related to node(s) associated with the first node, and the first interference is formed by forwarding a signal of the third base station by a second node; and performing the interference management related information.

Optionally, the method further comprises: receiving a first signal from the first terminal and/or sending a second signal to the first terminal, wherein information related to a first measurement of the first signal is used to generate first indication information indicating whether the third base station is an interfering base station for the first terminal, and information related to a second measurement of the second signal is used to generate second indication information indicating whether the third base station is the interfering base station for the first terminal.

Optionally, the method further comprises: in response to configuration of the first node, performing at least one of the following operations: receiving the first signal from the first terminal and measuring the first signal, reporting the measurement result of the first signal to the first node, and sending the second signal to the first terminal.

Optionally, the interference management related information includes at least one of: configuring a beam identification ID of the third base station corresponding to the first interference; or configuring a beam identification ID of the third base station corresponding to the first interference; a reduction offset amount of the transmit power; the physical position information of the second node.

Optionally, the method further comprises: determining that a condition for performing the interference management related information is not met, after receiving the interference management related information, and sending indication information for indicating that the interference management related information is rejected to the first node.

Various embodiments of the present disclosure provide a method performed by a second node in a wireless communication system, comprising: receiving configuration information from a second base station, wherein the configuration information includes physical position adjustment related information and/or codebook update related information, and the second base station is a base station of a serving cell of the second node; adjusting physical position and/or updating codebook based on the configuration information, wherein the configuration information is obtained by the second base station based on interference management related information received from the first node, the interference management related information is determined by the first node based on first information and second information, the first information is information on a first interference suffered by a first terminal, and the second information is information related to node(s) associated with the first node, wherein, the first interference is formed by forwarding a signal of an interfering base station by the second node.

Optionally, the second node may include a control module and a signal transmission module, wherein the control module is configured to receive configuration signaling, and the signal transmission module is configured to receive input signals and forward output beams in a specified direction.

Optionally, the method further comprises: receiving first configuration signaling from the base station of the serving cell of the second node, wherein the first configuration signaling is used to adjust the state of the output beams forwarded by the second node.

Optionally, the first configuration signaling is determined by the base station of the serving cell of the second node based on information of terminals connected to the base station of the serving cell of the second node, or determined by the base station of the serving cell of the second node based on the interference management related information.

Optionally, the first configuration signaling is related to one or more of the geographical location and physical state of the second node, information of input beams received by the second node, the geographical locations and physical states of terminals connected to the base station of the serving cell of the second node through the second node, and the design of the second node.

Optionally, the first configuration signaling includes one or more of the following: the physical position adjustment information of the second node, physical position adjustment indication information of the second node, the codebook information of the second node, and the codebook indication information of the second node.

Optionally, the physical position adjustment may include one or more of the following: adjustment of the spatial angle of the second node, adjustment of the spatial position of the second node, and adjustment of the relative positions among submodules of the second node.

The codebook information of the second node may include loaded voltage adjustments of each adjustable structure on the signal transmission module of the second node.

Various embodiments of the present disclosure provide a node device in a wireless communication system, comprising: a transceiver, and a processor, coupled with the transceiver and configured to perform the method of the embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In order to illustrate the technical schemes of the embodiments of the present disclosure more clearly, the accompanying drawings of the embodiments will be briefly introduced below. Obviously, the accompanying drawings in the following description only relate to some of the embodiments of the present disclosure, and are not limited to the present disclosure.

The accompanying drawings herein, which are incorporated in and constitute a part of this specification, illustrate exemplary embodiments consistent with the present disclosure, and together with the description, serve to explain the principles of the present disclosure, and do not unduly limit the present disclosure.

Figure 1:
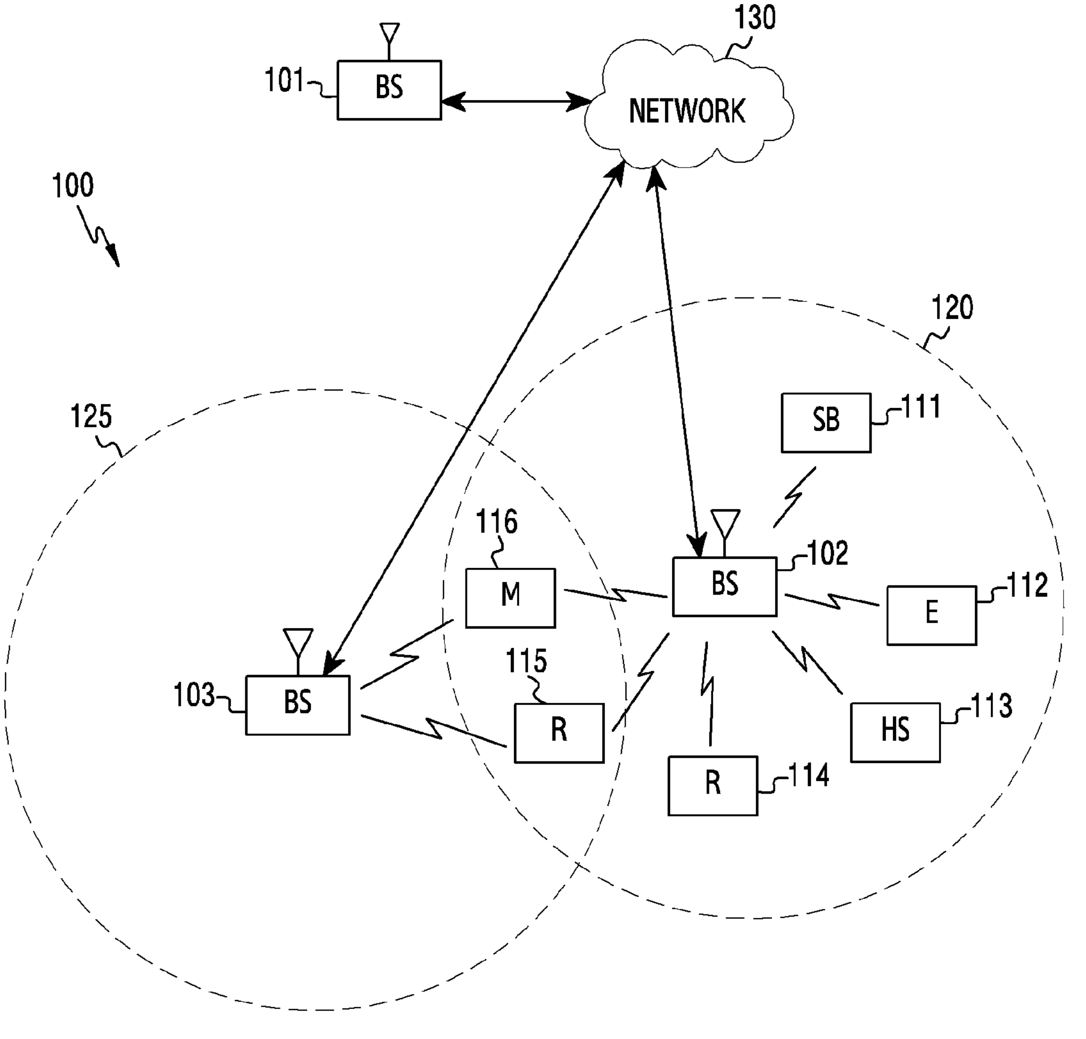
FIG. 1 illustrates an example of a wireless network 100 according to various embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems."

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (COMP), reception-end interference cancellation, etc.

In 5G systems, hybrid FSK and QAM modulation (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit the existence of one or more additional functions, operations, or components. The terms such as "include" and/or "have" may be construed to denote a certain characteristic, number, step, operation, constituent element, component, or a combination thereof, but may not be construed to exclude the possibility of existence of one or more other characteristics, numbers, steps, operations, constituent elements, components, or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

When describing the embodiments of the present disclosure, description related to technical contents well-known in the art but not directly related to the present disclosure may be omitted. Such omission of unnecessary description is intended to prevent confusion of the main idea of the present disclosure.

Advantages and features of the present disclosure and implementations thereof will be apparent by referring to the following embodiments in detail in conjunction with the accompanying drawings. However, the present disclosure is not limited to the embodiments set forth below, but may be implemented in various forms. The following embodiments are provided only to fully disclose the present disclosure and inform those skilled in the art of the scope of the present disclosure, and the present disclosure is only defined by the scope of the appended claims. Throughout the specification, the same or similar reference numerals refer to the same or similar elements.

Herein, it should be understood that each block of flowchart illustrations and combinations of blocks in the flowchart illustrations may be implemented by computer program instructions. These computer program instructions may be provided to a processor of a general-purpose computer, a special-purpose computer, or other programmable data processing apparatus to produce a machine, such that the instructions executed via the processor of the computer or other programmable data processing apparatus create means for implementing the functions specified in one or more flowchart blocks. These computer program instructions may also be stored in a computer-usable or computer-readable memory, which may instruct a computer or other programmable data processing apparatus to operate in a specific way, so that the instructions stored in the computer-usable or computer-readable memory produce an article of manufacture, which includes instruction means that implement the functions specified in one or more flowchart blocks. Computer program instructions may also be loaded on a computer or other programmable data processing apparatus to cause a series of operations to be performed on the computer or other programmable apparatus to produce a computer-implemented process, so that the instructions executed on the computer or other programmable apparatus provide operations for implementing the functions specified in one or more flowchart blocks.

Furthermore, each block of the flowchart may represent a module, segment, or portion of code, which includes one or more executable instructions for implementing specified logical function(s). It should also be noted that in some alternative implementations, functions shown in the blocks may occur out of order. For example, depending on the functions involved, two blocks shown in succession may actually be performed substantially at the same time, or the blocks may be performed in a reverse order.

Various embodiments of the present disclosure may be implemented as computer-readable codes embodied on a computer-readable recording medium from a specific perspective. The computer-readable recording medium may be a volatile computer-readable recording medium or a non-volatile computer-readable recording medium. A computer-readable recording medium is any data storage device that can store data readable by a computer system. Examples of computer-readable recording media may include read-only memory (ROM), random access memory (RAM), compact disk read-only memory (CD-ROM), magnetic tape, floppy disk, optical data storage device, carrier wave (e.g., data transmission via the Internet), etc. Computer-readable recording media can be distributed by computer systems connected via a network, and thus computer-readable codes can be stored and executed in a distributed manner. Furthermore, functional programs, codes, and code segments for implementing various embodiments of the present disclosure can be easily explained by those skilled in the art to which the embodiments of the present disclosure are applied.

It will be understood that the embodiments of the present disclosure may be implemented in the form of hardware, software, or a combination of hardware and software. The software may be stored as program instructions or computer-readable codes executable on a processor on a non-transitory computer-readable medium. Examples of non-transitory computer-readable recording media include magnetic storage media (such as ROM, floppy disk, hard disk, etc.) and optical recording media (such as CD-ROM, digital video disk (DVD), etc.). Non-transitory computer-readable recording media may also be distributed on computer systems coupled to a network, so that computer-readable codes are stored and executed in a distributed manner. The medium can be read by a computer, stored in a memory, and executed by a processor. Various embodiments may be implemented by a computer or a portable terminal including a controller and a memory, and the memory may be an example of a non-transitory computer-readable recording medium suitable for storing program(s) with instructions for implementing embodiments of the present disclosure. The present disclosure may be realized by a program with code for concretely implementing the apparatus and method described in the claims, which is stored in a machine (or computer)-readable storage medium. The program may be electronically carried on any medium, such as a communication signal transmitted via a wired or wireless connection, and the present disclosure suitably includes its equivalents.

Technical schemes of embodiments of the present application may be applied to various communication systems, such as Global System for Mobile Communications (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Universal Mobile Telecommunications System (UMTS), Worldwide Interoperability for Microwave Access (WiMAX) communication system, 5th Generation (5G) system, 6G system or New Radio (NR), etc. In addition, the technical schemes of embodiments of the present application may be applied to future-oriented communication technologies.

FIG. 1 illustrates an example of a wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB." For convenience, the terms "gNodeB" and "gNB" are used in this patent document to refer to network infrastructure components that provide wireless access for remote terminals. And, depending on the type of the network, other well-known terms such as "mobile station," "terminal station," "remote terminal," "wireless terminal" or "terminal apparatus" can be used instead of "terminal equipment" or "UE." For convenience, the terms "terminal equipment" and "UE" are used in this patent document to refer to remote wireless devices that wirelessly access the gNB, no matter whether the UE is a mobile device (such as a mobile phone or a smart phone) or a fixed device as considered commonly (such as a desktop computer or a vending machine).

gNB 102 provides wireless broadband access to the network 130 for a first plurality of user equipments (UEs) within a coverage area 120 of gNB 102. The first plurality of UEs include a UE 111, which may be located in a small business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. gNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, long term evolution (LTE), LTE-A, WiMAX, or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of a wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
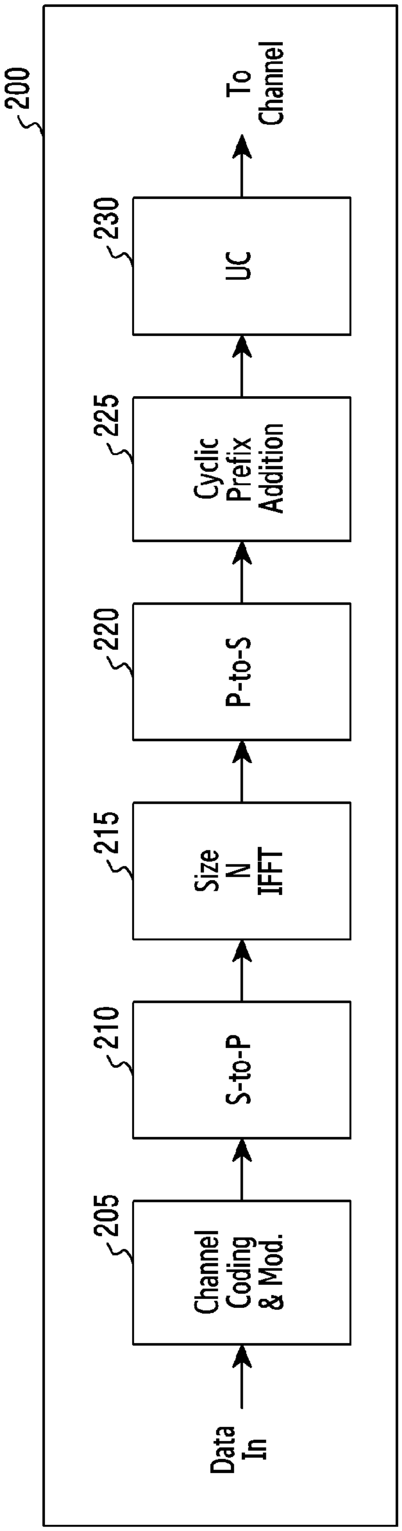
FIG. 2A illustrates an example of wireless transmission and reception paths according to various embodiments of the present disclosure.
Figure 2B:
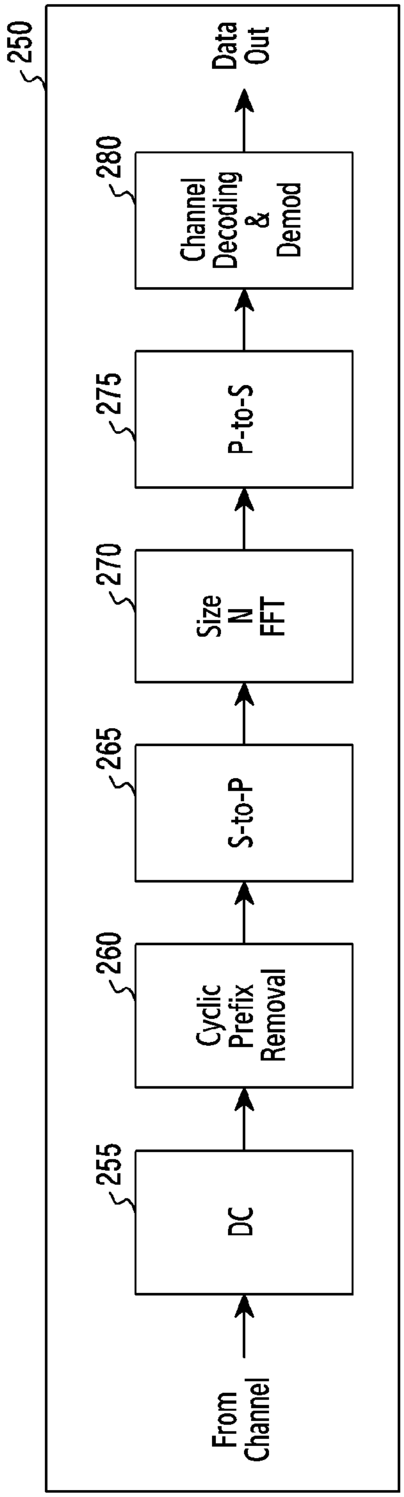
FIG. 2B illustrates an example of wireless transmission and reception paths according to various embodiments of the present disclosure.

FIGS. 2A and 2B illustrate examples of wireless transmission and reception paths according to the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The serial-to-parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The serial-to-parallel block 265 converts the time-domain baseband signal into a parallel time-domain signal. The size N FFT block 270 performs an FFT algorithm to generate N parallel frequency-domain signals. The parallel-to-serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
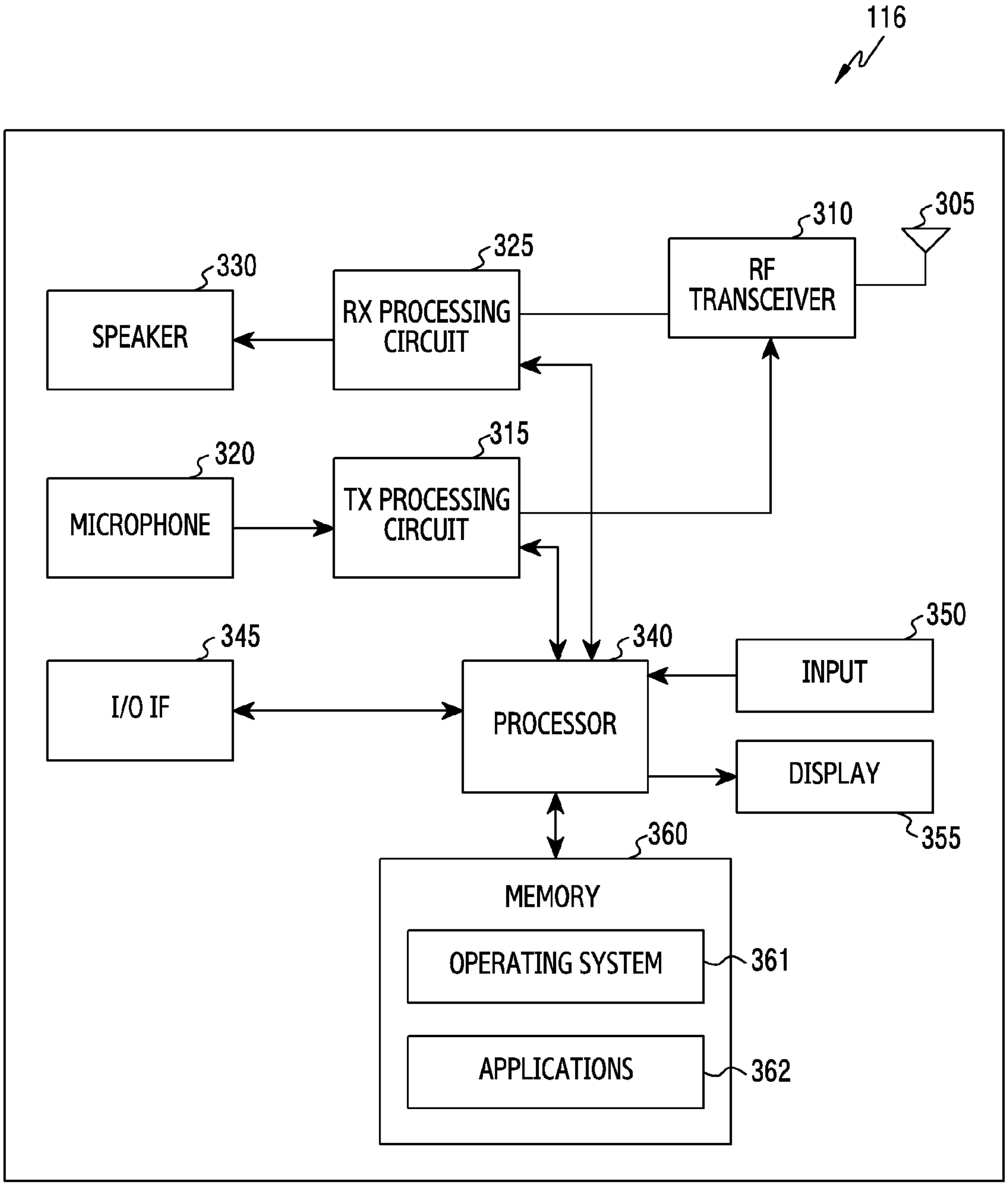
FIG. 3A illustrates an example of a UE according to various embodiments of the present disclosure.

FIG. 3A illustrates an example of a UE 116 according to the present disclosure. The embodiment of UE 116 shown in FIG. 3A is for illustration only, and UEs 111-115 of FIG. 1 can have the same or similar configuration. However, a UE has various configurations, and FIG. 3A does not limit the scope of the present disclosure to any specific implementation of the UE.

UE 116 includes an antenna 305, a radio-frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email, or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs may be configured to operate as other types of mobile or fixed devices.

Figure 3B:
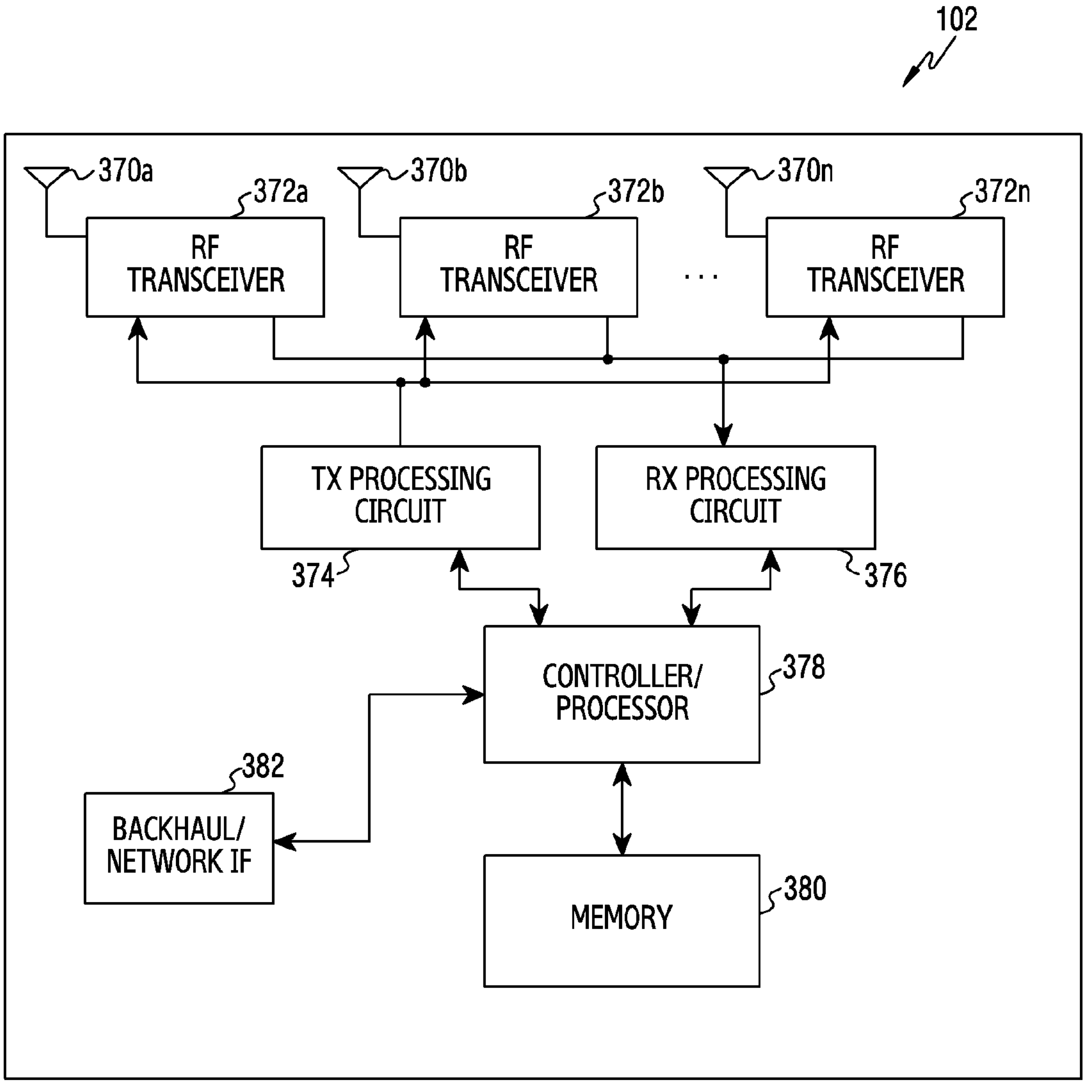
FIG. 3B illustrates an example of a gNB according to various embodiments of the present disclosure.

FIG. 3B illustrates an example of a gNB 102 according to the present disclosure. The embodiment of gNB 102 shown in FIG. 3B is for illustration only, and other gNBs of FIG. 1 can have the same or similar configuration. However, a gNB has various configurations, and FIG. 3B does not limit the scope of the present disclosure to any specific implementation of a gNB. It should be noted that gNB 101 and gNB 103 can include the same or similar structures as gNB 102.

As shown in FIG. 3B, gNB 102 includes a plurality of antennas 370*a*-370*n*, a plurality of RF transceivers 372*a*-372*n*, a transmission (TX) processing circuit 374, and a reception (RX) processing circuit 376. In certain embodiments, one or more of the plurality of antennas 370_a_-370_n_ include a 2D antenna array. gNB 102 also includes a controller/processor 378, a memory 380, and a backhaul or network interface 382.

RF transceivers 372_a_-372_n_ receive an incoming RF signal from antennas 370_a_-370_n_, such as a signal transmitted by UEs or other gNBs. RF transceivers 372_a_-372_n_ down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email, or interactive video game data) from the controller/processor 378. TX processing circuit 374 encodes, multiplexes and/or digitizes outgoing baseband data to generate a processed baseband or IF signal. RF transceivers 372_a_-372_n_ receive the outgoing processed baseband or IF signal from TX processing circuit 374 and up-convert the baseband or IF signal into an RF signal transmitted via antennas 370_a_-370_n_.

The controller/processor 378 can include one or more processors or other processing devices that control the overall operation of gNB 102. For example, the controller/processor 378 can control the reception of forward channel signals and the transmission of backward channel signals through the RF transceivers 372_a_-372_n_, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions is configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372_a_-372_n_, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Hereinafter, for the convenience of understanding, a "first node" may be understood as a cooperative node, a "second node" may be understood as a relay node, and a "first terminal" may be understood as a terminal interfered by an interfering base station. Such interference may be called a "first interference" and may be formed by forwarding a signal sent for the interfering base station by the relay node. A "first base station" may be used to represent a base station of a serving cell of the interfered terminal, a "second base station" may be used to represent a base station of a serving cell of the relay node, and a "third base station" may be used to represent other base station managed by the cooperative node than the base station of the serving cell of the interfered terminal, or a base station managed by other node connected with the cooperative node. The interfering base station may be included among at least one third base station. A "first signal" may be used to represent a signal sent by the first terminal to the third base station, such as SRS or ZP CSI-RS, and a measurement result of the first signal (which may be called "first measurement related information") may be used to determine whether the third base station is an interfering base station for the first terminal. A "second signal" may be used to represent a signal sent by the third base station to the first terminal, such as SSB, and a measurement result of the second signal (which may be called "second measurement related information") may be used to determine whether the third base station is an interfering base station for the first terminal. "First indication information" may be used to represent information indicating whether the third base station is an interfering base station for the first terminal, based on the first measurement related information. "Second indication information" may be used to represent information indicating whether the third base station is an interfering base station for the first terminal, based on the second measurement related information. "Third indication information" may be used to represent information indicating the interfering base station not to send downlink signals on configured beam ID. "Fourth indication information" may be used to represent information indicating the interfering base station to reduce transmission power for sending downlink signals on configured beam ID. "Interference management related information" may be understood as information related to an interference management scheme for the first interference to the first terminal determined by the cooperative node.

Various methods according to the embodiments of the present disclosure can be applied to wireless communication systems, for example, 5G systems, 6G systems, etc. Various methods according to the embodiments of the present disclosure can also be applied to sidelink communication systems. According to various embodiments of the present disclosure, there is provided a communication cooperative system based on a relay device, wherein the communication cooperative system includes at least one of a base station, a relay node, a cooperative node and a terminal (the terminal may also be called a "receiving node"). The relay node may be configured to receive a signal from a base station and forward it, and the physical position and/or codebook information of the relay node may be adjusted according to control information given by the base station; the cooperative node may be configured to receive control information over the relay node sent by a plurality of base stations, determine an interference source and output instructions related to beam adjustment to the base station, so as to reduce or eliminate the interference of the base station to the terminal. Exemplarily, a signal of a direct path between base station 1 and receiving node 1 is called signal 1, and the relay node provides an additional available signal 2 for communication between the base station 1 and the receiving node 1, as a signal of an indirect path between the base station 1 and the receiving node 1, so as to assist the communication between the base station 1 and the receiving node 1. Signal 4 may be generated after a signal of base station 2 is forwarded by the relay node, and a signal of a direct path between base station 2 and receiving node 2 is called signal 3. The signal 4 received by the receiving node 2 may cause interference to the receiving node 2, so that the communication quality of the signal 3 directly received by the receiving node 2 from the base station 1 deteriorates. The cooperative node may output an adjustment scheme based on information shared by the base station (also called "transmitting node") 1 and the base station 2, and inform a corresponding node to make adjustments.

Optionally, the adjusted node may be a transmitting node, and the adjustment comprises requesting the transmitting node to avoid output of interference energy. For example, the transmitting node may be requested either not to send downlink signals on a configured beam ID corresponding to signal 4, or to reduce transmission power for sending downlink signals.

Optionally, the relay node may be connected with a base station 3, and communication between the base station 3 and the cooperative node is required at this time.

Optionally, the adjusted node may be a relay node, and the adjustment comprises requesting the relay node to change the direction for energy forwarding through a base station connected with the relay node.

Optionally, the adjusted node may be a receiving node, and the adjustment comprises requesting the receiving node to avoid reception of interference signals.

Optionally, the communication of the signal 4 may be performed via a connection between other base station n (n+1, 2) and a terminal 2.

Optionally, the number of base stations, terminals, relay nodes and cooperative nodes can each be one or more, thereby forming a transmission network and meeting transmission requirements for a plurality of groups of data at the same time.

Optionally, if there are a plurality of cooperative nodes, and the plurality of cooperative nodes are respectively connected with different base stations, then at least part of the reporting information of the transmitting node and the adjustment scheme of the cooperative nodes need to be exchanged between the cooperative nodes.

Optionally, the relay node may have various structural forms, such as smart reconfigurable antenna (reconfigurable intelligence surface (RIS))/repeater/relay/micro base station, etc.

Optionally, the cooperative node may receive a specified part of the shared information of the base station, for example, part or all of the shared information. The shared information may include at least one of physical position and form of the transmitting node, physical position and form of the relay node, pairing relationship and control information for the transmitting node and the relay node, and spatial position information of the terminal with large interference, so that the cooperative nodes is facilitated to determine the interference source and output the adjustment scheme.

Optionally, the cooperative node may verify accuracy of determining and calculating the interference source, by controlling the base station or terminal to send and/or receive certain specific information (or test signal or verification signal), e.g., SRS, ZP CSI-RS or SSB, and to receive a result of verifying information through some nodes.

Optionally, the relay node may have various physical forms, including but not limited to plane, sector surface, shaped surface, etc. The spatial position of the relay node may not be fixed, and the relative position and angle of the relay node may be changed by control signaling to increase freedom of regulation, so that the purpose of eliminating interference can be achieved without adjusting the transmitting node, and the communication between a base station and an existing terminal accessing the base station will not be affected.

Optionally, the relay node may be at least one of metamaterial antenna, holographic antenna, phased array antenna, etc. Its operating mode may be a reflection, transmission, absorption or mixed mode. The relay node may have an adjustable structure, which may be implemented by materials such as PIN diode, switch, varactor, liquid crystal, ferrite material, MEMS, graphene, vanadium dioxide, etc., but is not limited thereto. By controlling modulation of parameters of the foregoing materials, a change in parameters such as antenna transmission gain, direction, polarization, etc. can be realized. The array units of the relay node are arranged in a certain rule, with a spacing between array units being generally less than $\lambda/2$.

Optionally, the relay node may be divided into a plurality of groups of sub-arrays, which may be used for adjustment of a plurality of bands and a plurality of beams respectively. The distribution of the plurality of groups of sub-arrays may be modular distribution, cross distribution, etc.

The technical solution provided by the embodiments of the present disclosure can at least bring the following beneficial effects: if the signal 4 generated after the signal of the base station 2 is forwarded by the relay node is the interference signal of the terminal 2, the interference can be reduced and thus the information transmission quality can be improved by means of information reporting by terminal 2 and comprehensive adjustment (e.g., interference management) of cooperative nodes.

It is to be understood that both the foregoing general description and the following detailed description are exemplary and explanatory only and cannot limit the present disclosure.

With the rapid development of mobile communication technology, higher requirements are presented for transmission rate and bandwidth of the network. During the deployment and development of the new generation communication technology, advantages such as large bandwidth, high rate, etc., of high-frequency communication are obvious, but problems are also exposed such as short transmission distance, high power consumption, high cost, etc., especially in high-frequency bands such as millimeter wave and terahertz (THz) band. Such problem limits the large-scale application of high-frequency communication to a certain extent, which leads to the slow progress of global commercialization of high-frequency communication.

The transmission distance of signal is inversely proportional to the operating frequency. For the same base station transmission power and the same transmission distance, the higher the frequency band is, the weaker the strength of the received signal is. The signal attenuation caused by materials such as walls, trees, etc., at high frequency is more serious, resulting in more signal blind areas. In order to meet the complete coverage of high-frequency signals, the transmission power of base stations may be improved or the construction density of base stations may be increased. However, the resulting equipment cost and energy consumption of base stations may increase sharply, which may become a major obstacle to the large-scale commercialization of high-frequency communication.

By means of introduction of relay device (as an assistance communication device), an additional path may be provided for signal transmission, so as to bypass obstacles with high attenuation. Alternatively, by increasing the number (or size) of units of the relay device and narrowing the width of output beam, the energy may be concentrated correspondingly, which may meet requirements for long-distance transmission. A concept of repeater is introduced in communication systems, which includes components such as power amplifier, etc. Receiving, forwarding and amplifying the signal from the base station may provide a higher gain in signal transmission. In order to meet a demand for low power consumption and low cost in the system, a concept of reconfigurable intelligent surface (RIS) is presented, which has only a few or has no high-power devices, thus leading to a less demand for system power supply and a lower cost, so it can be used for large-scale deployment. Relay devices such as micro-base stations, backhauls, etc., may be used to assist the enhancement of coverage of the base station. For a device such as RIS, repeater, etc., in order to simplify its design as much as possible, the device does not have the function for processing and analyzing the incident signal, so when the device is used as a relay device, the device cannot identify the source of the signal arriving at the relay device, but perform signal forwarding only. Signals that arrive at the relay device (e.g., signal 4 as described above) may also be enhanced, and some signals that arrive at the relay device and are forwarded by the relay device may cause interference to other receiving devices.

In view of the above, the present disclosure mainly relates to a communication cooperation method based on relay device, which is suitable for a communication system composed of nodes such as base stations, terminals, relay nodes, cooperative nodes, etc., and the number of the respective nodes may be one or more. Reception, forwarding and transmission of signals are conducted between the relay node, the base station and the terminal, which may be in a form of repeater, RIS, micro base station, etc. A cooperative node, which connects and communicates with base stations within a certain range, may be a core network node. Alternatively, the function of the cooperative node may be conducted by a designated base station, for example, as a coordination function module of the designated base station. By employing the communication cooperative system and method according to various embodiments of the present disclosure, the influence of inter-cell interference on terminals can be effectively reduced, or by employing the communication cooperative system and method according to various embodiments of the present disclosure, the requirements for communication quality of a plurality of cells and/or a plurality of terminals can be met.

Next, a communication cooperative system according to the embodiments of the present disclosure will be described with reference to FIGS. 4 to 20. If the number of the respective nodes increases when the communication cooperative system is applied, the following ideas may be referred to, so as to solve the interference problem occurred in the communication cooperative system by means of joint optimization. Alternatively, if a plurality of groups of nodes form a plurality of subsystems, respectively, interference management can be realized by means of multi-layer cooperation within or between subsystems.

Text and drawings are provided as examples only to help the readers understand the present disclosure. They are not intended and should not be construed to limit the scope of the present disclosure in any manner. Although certain embodiments and examples have been provided, based on the present disclosure herein, it is obvious to those skilled in the art that changes can be made to the illustrated embodiments and examples without departing from the scope of the present disclosure.

Figure 4:
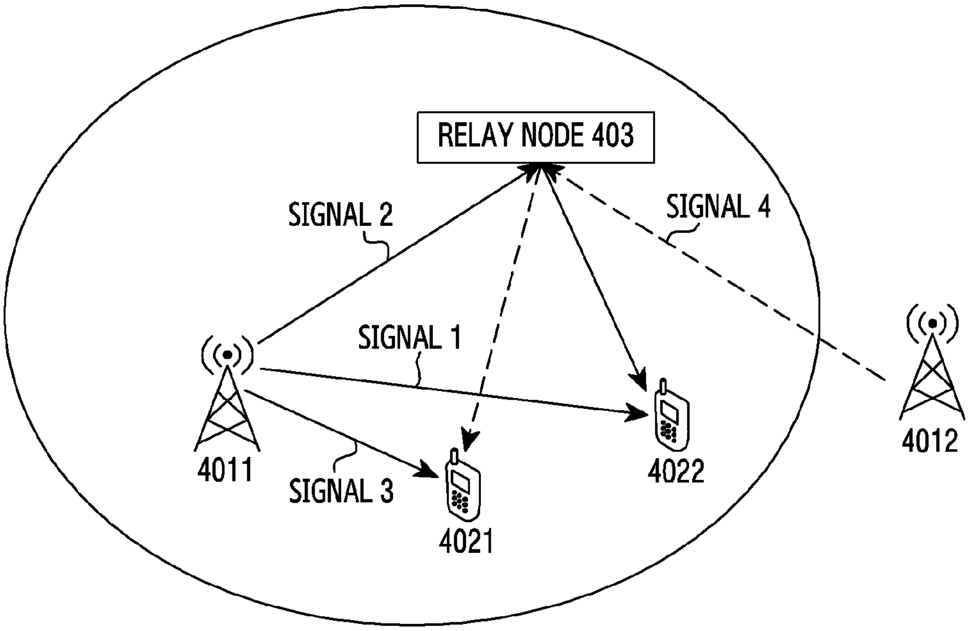
FIG. 4 illustrates an example of a scenario of transmitting signals according to various embodiments of the present disclosure.

FIG. 4 illustrates an example of a scenario of transmitting signals according to various embodiments of the present disclosure.

As shown in FIG. 4, a signal transmitted on a direct path of communication between base station 4011 and terminal 4022 is called signal 1. Relay node 403 provides an additional indirect path for communication between the base station 4011 and the terminal 4022, and a signal transmitted on the indirect path is called signal 2, which is used for assisting the communication via the direct path. A signal transmitted on a direct path of communication between the base station 4011 and terminal 4021 is called signal 3. The relay node 403 may have no data processing and analysis functions. At this time, a signal 4 of base station 4012 arriving at the relay node 403 may be forwarded by the relay node 403 and be enhanced in a designated direction. If the terminal 4021 receives the signal 4 forwarded by the relay node 403, the signal 4 is an interference signal for the terminal 4021, and thus the communication quality of the signal 3 received by the terminal 4021 deteriorates.

In order to solve the problem that the signal 4 forwarded by the relay node 403 causes interference to the terminal 4021, the embodiment of the present disclosure introduces a cooperative node which determines an adjustment (e.g., interference management) scheme, notifies relevant base stations and/or relay nodes, and adjusts base stations and relay nodes, thereby reducing interference and improving signal transmission quality. The transmission of signals related to the regulation/adjustment (e.g., interference management) of cooperative nodes (e.g., including but not limited to signals sent by the base station to the cooperative node for reporting identification of base station, signals for transmitting interference management related information, and so on) occurs between the base station and the cooperative node, between the base station and the relay node, and between the base station and the terminal.

Figure 5:
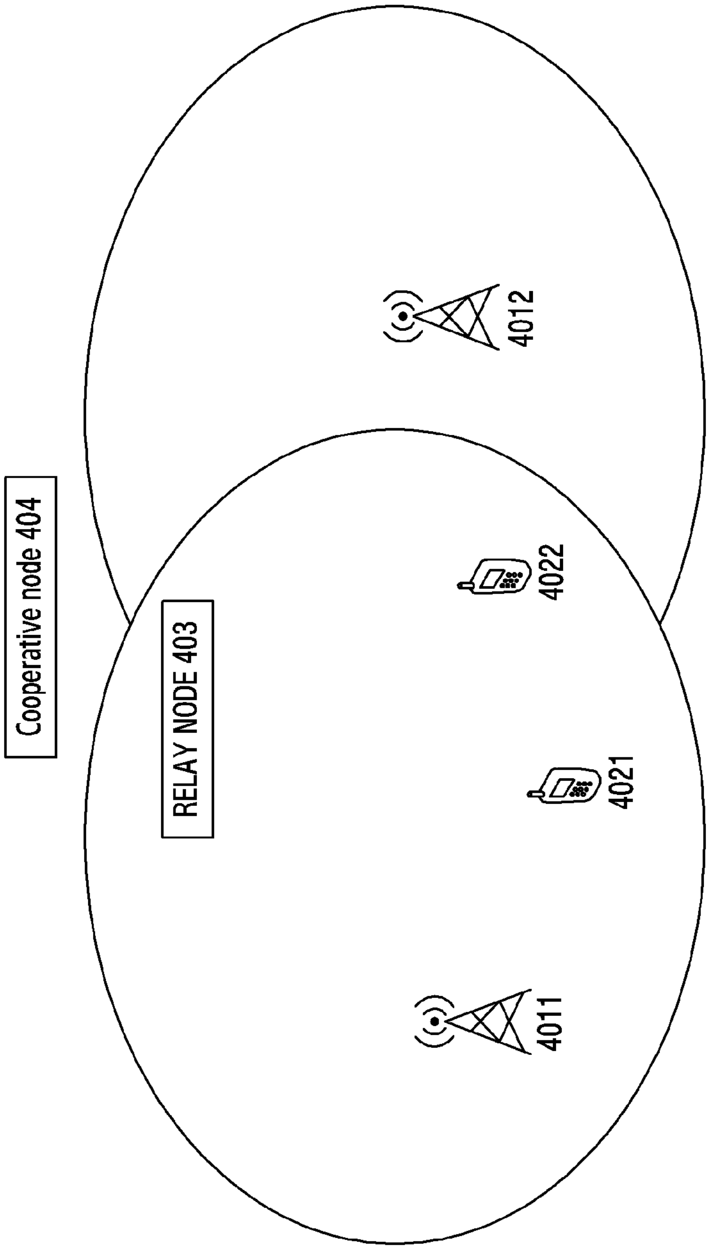
FIG. 5 illustrates an example of a communication cooperative system according to various embodiments of the present disclosure.

FIG. 5 illustrates an example of a communication cooperative system according to various embodiments of the present disclosure. The communication cooperative system manages one or more base stations (e.g., base station 4011 and base station 4012) and one or more terminals (e.g., terminal 4021 and terminal 4022) connected with the one or more base stations by means of a cooperative node 404 (e.g., it may be called a "first node"), so as to reduce or eliminate, within the management scope of the cooperative node 404, the user interference caused by the introduction of the relay node 403. For example, the relay node 403 forwards the signal sent from the base station 4012 (e.g., it may be called an "interfering base station"), which causes the signal to be received by the terminal 4021 (e.g., it may be called a "first terminal") that may not have received the signal, thus causing an interference to the terminal 4021. Such interference may be called a "first interference." In order to enhance the signal quality, or to bypass the obstacles in the direct connecting direction between the base station 4011 (e.g., it may be called a "first base station") and the terminal 4022 (e.g., it may be called a "first terminal"), the relay node 403 (e.g., it may be called a "second node") is introduced for the communication connection of the terminal 4022. The cooperative node 404 may perform signaling interaction with each base station and/or each relay node. For example, when the cooperative node 404 is a core network node, the core network node can configure each base station and/or configure the relay node 403 through each base station, and so on.

The relay node 403 may be composed of a control module 4031 and a signal transmission module 4032. The control module 4031 of the relay node 403 may operate in the same frequency band as the signal transmission module 4032, may also operate in a different frequency band from the signal transmission module 4032, or may perform wired transmission through a network cable or the like. The signal transmission module 4032 may receive input signals and transmit signals in a designated direction according to the configuration signaling received by the control module 4031, wherein the codebook modulation scheme of the control module 4031 may be determined according to the configuration signaling received by (the control module 4031 of) the relay node 403. The direction in which the signal of the relay node 403 is output is related to at least one of: the direction in which the input beam from the base station arrives at the relay node 403, the distance between the relay node 403 and the base station, the structural design of the relay node, the adjustment and control scheme of the relay node, and so on. If the input angles at which the input beams from the base station arrive at the relay node 403 are different, the shapes of the output beams generated after being forwarded by the relay node 403 may also be different.

The control module 4031 of the relay node 403 may receive configuration signaling, for example, the control module 4031 may have a terminal function, may establish a radio resource control (RRC) connection with the base station 4011, and may receive configuration signaling (e.g., from the base station), and so on. The correspondence between the relay node 403 that establishes a connection with the base station 4011 and the base station 4011 may be acquired by the cooperative node 404. For example, the base station 4011 may report the identification information of the relay node 403 and the identification information of the base station 4011 to the cooperative node 404. The configuration signaling may include at least one of: real-time codebook indication information (or codebook information) of the relay node 403, on-off control information of the relay node 403, and physical state adjustment information of the relay node 403. The codebook information/codebook indication information received by the relay node 403 may be used to adjust at least one of the operating frequency, operating mode (e.g., reflection, transmission, absorption, and combination), the number of output beams, the directions of output beams and the power of output beams, of the relay node 403. The physical state adjustment information of the relay node 403 may include information for at least one of altitude adjustment of the relay node 403, or angle adjustment of the relay node 403, or relative position adjustment of the relay node 403.

The signal transmission module 4032 of the relay node 403 may be composed of a plurality of units arranged periodically (e.g., in a two-dimensional distribution with an interval of $\lambda/2$, where $\lambda$ is the wavelength corresponding to the operating frequency) and a driving module for controlling the plurality of units. A first phase distribution matrix when the output beam of the relay node 403 arrives at the surface of the signal transmission module 4032 may be obtained, according to the shape, incident angle and distance of the input beam from the base station to the relay node 403. A second phase distribution matrix when the output beam leaves the surface of the transmission module 4032 may be derived reversely, according to the direction in which the output beam is desired to be output. The difference between the first phase distribution matrix and the second phase distribution matrix is the compensation matrix for which the signal transmission module 4032 needs to compensate. The compensation adjustment for the compensation matrix may be implemented by adjusting the control voltage of the adjustable structure of each unit in the array of the signal transmission module 4032. The voltage matrix information corresponding to the compensation matrix may be transferred in the form of codebook, or the codebook number may be transferred, or only the codebook number indication may be transferred, so as to reduce the overhead of transmission of the voltage matrix information. The aforementioned codebook information may be sent by the base station, and the receiver of the control module 4031 of the relay node 403 receives the codebook information and transmits the codebook information to the voltage controller of the relay node 403, so as to adjust the control voltage of the adjustable structure of each unit in the array of the signal transmission module 4032.

The relay node 403 may be composed of periodic units, so different input beams with different input beam directions from different base stations may produce phase differences when they arrive at the relay node 403, and such phase differences are related to at least one of the operating frequency of the relay node 403, the spacings between units, the angle of input beam, and the distance d between the base station and the relay node 403.

Figure 6A:
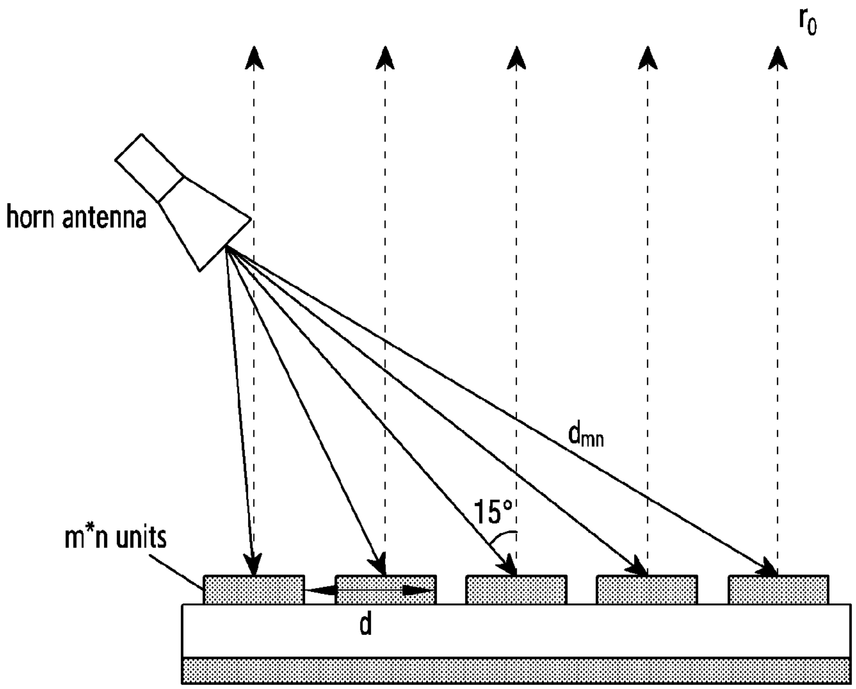
FIG. 6A illustrates an example of an incident beam at a relay node according to various embodiments of the present disclosure.

FIG. 6A illustrates an example of an incident beam at a relay node according to various embodiments of the present disclosure. As shown in FIG. 6A, different dashed lines represent the incident waves of different units. Take an oblique incident angle of 15° as an example, if the lengths of the transmission paths are different, then the phases of the incident wave arriving at respective units may also be different in phase. For the relay nodes of the two-dimensional array of m*n units, such phase difference may form an m*n input phase difference matrix.

Figure 6B:
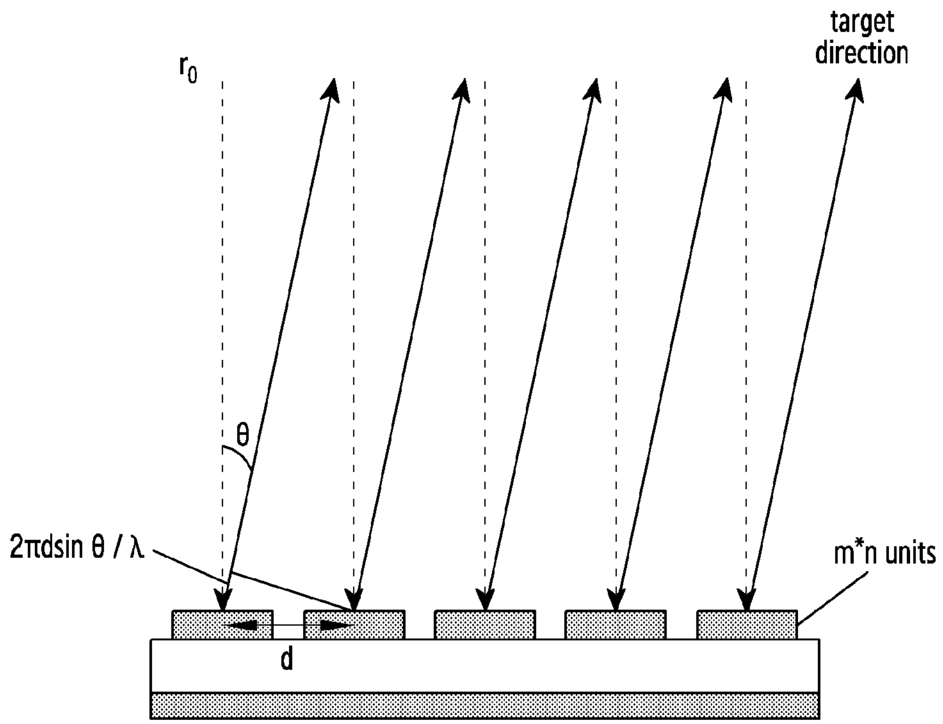
FIG. 6B illustrates an example of an outgoing beam at a relay node according to various embodiments of the present disclosure.

FIG. 6B illustrates an example of an outgoing beam at a relay node according to various embodiments of the present disclosure. For the outgoing beam, when the target direction is not normal, the transmission paths of respective units may be different, and the phase difference between two adjacent units is related to the spacings between units, the outgoing angle and the wavelength. Similarly, for the relay nodes of the two-dimensional array of m*n units, such phase difference may form an m*n outgoing phase difference matrix.

Figure 7:
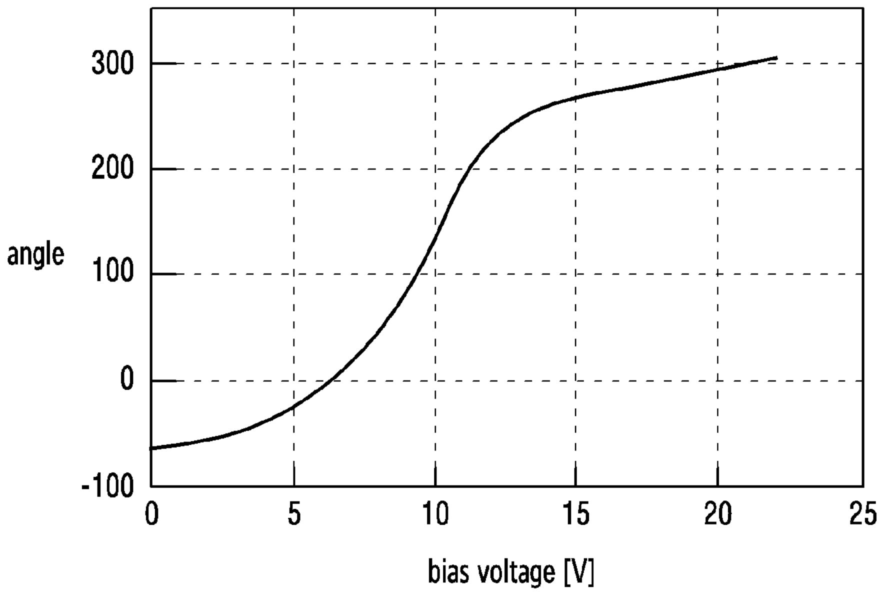
FIG. 7 illustrates an example of output phase compensation at a relay node according to various embodiments of the present disclosure.

FIG. 7 illustrates an example of output phase compensation at a relay node according to various embodiments of the present disclosure.

As shown in FIG. 7, each unit of the relay node is loaded with (or has or contains) a phase adjustment structure. The phases of the units of the relay node may be adjusted by voltage, and the adjusted value is the sum of the input and output phase compensation matrices. A corresponding control voltage matrix may be obtained with reference to the curve of the relationship between voltage and phase of the units of the relay node. The control voltage matrix is generated by the control module 4031 of the relay node 403, and the control module 4031 generates a specific indication signal required for a designated voltage, i.e., the codebook information communicated by the base station with the relay node 403. For the same incident beam, different codebooks may realize different adjustments of beam output directions. Different output beam directions may be obtained when the same codebook is applied to different input beam directions.

In some examples, in order to reduce the overhead of signaling interaction, the codebook correspondence may be stored in advance at the base station and the relay node. During the transmission of codebook information, only the codebook number or other information available for accurately querying the codebook may be transmitted.

The relay node 403 may be metamaterial antenna, holographic antenna, phased array antenna, etc. Its operating mode may be a reflection, transmission, absorption, or mixed mode. The relay node 403 may have an adjustable structure, which may be implemented by materials such as PIN diode, switch, varactor, liquid crystal, ferrite material, MEMS, graphene, vanadium dioxide, etc., but is not limited thereto. By controlling modulation of parameters of the foregoing materials, a change in parameters such as antenna transmission gain, direction, polarization, etc. can be realized. The array units of the relay node 403 are arranged in a certain rule, with a spacing between array units being generally less than λ/2.

Optionally, the relay node 403 may have various physical forms, including but not limited to rectangular surface, sector surface, curved surface, shaped surface, etc.

Optionally, the spatial position of the relay node 403 may not be fixed, and the freedom of regulation may be increased by changing its spatial position, angle, or relative position between sub-modules through control signaling.

Optionally, the relay node 403 may add a specific function by means of the introduction of radio frequency devices. For example, the transmission distance may be increased by adding a power amplifier to amplify and enhance the signal.

Optionally, the relay node may be divided into a plurality of groups of sub-arrays, which may be used for adjustment of a plurality of bands and a plurality of beams respectively, and the distribution of the plurality of groups of sub-arrays may be modular distribution, cross distribution, etc.

The cooperative node 404 may serve and coordinate the transmission of the base stations and/or relay nodes within a certain range, or the activities of other nodes connected with the base stations. The cooperative node 404 may be a core network node, or a certain base station (e.g., the base station 4011 or the base station 4012) may concurrently serve as the cooperative node 404.

The cooperative node 404 may store information (which may be called "second information") of other nodes within the serving range of the cooperative node 404 (e.g., it may be called a "node associated with the first node"), for example, information related to physical positions of other nodes, such as codebook related information of the relay node. Other nodes include terminals (e.g., terminals 4021 and/or 4022), base stations (e.g., base stations 4011 and/or 4012), relay nodes (e.g., relay node 403), etc. Such information may be stored in advance, reported by the base station within the serving range of the cooperative node 404, or calculated according to certain information reported by the base station within the serving range of the cooperative node 404. The cooperative node 404 may also receive information from the base station, or information forwarded by the base station, or update information of other nodes forwarded by the base station, which may be called "first information," for example. The first information may be at least one of: identification information of the first base station, information related to downlink beams sent by the first base station and received by the first terminal, information related to the distance between the first terminal and the first base station, and information related to the quality of the signal received by the first terminal. Based on at least one of the above-mentioned information as a reference, the cooperative node 404 may calculate an optimal interference management scheme (which may be called "interference management related information") and notify the corresponding base station (e.g., the interfering base station), or notify the node (e.g., terminals 4021 and/or 4022) that can communicate with the base station through the base station.

In some examples, the information reported by the base station (e.g., 4011 and/or 4012) to its corresponding cooperative node 404 (e.g., it may be called "second information") may be at least one of: identification code of the base station, identification code of the relay node connected with the base station, physical state information of the relay node (e.g., static or quasi-static information such as identification code, position, altitude etc.), current codebook information of the relay node (hereinafter called codebook), and correspondence between codebook and beam state of the relay node (or a method of calculating codebook according to beam state). If the forgoing reported information changes, it may be necessary for the base station to report the change to the cooperative node 404 so that the cooperative node 404 may update the corresponding information. The updated information may be at least one of: declination angle adjustment of the base station, altitude of the relay node, change in position or angle, handover of the base station to which the relay node is connected, and configuration signaling for the relay node by the base station.

If there are a plurality of cooperative nodes serving different sets of base stations within the range of the environment that needs cooperation, then management (e.g., interference management) may be carried out through cooperation between cooperative nodes. Information may be shared among cooperative nodes, and be comprehensively (or centrally) managed by a certain cooperative node, or alternatively, an independent cooperative node may be set up for comprehensively managing a plurality of sub-cooperative nodes.

Various embodiments of the present disclosure provide a cooperative system, in which the interference signals between cells are managed by cooperative nodes as a whole.

The information required by the cooperative node for interference management may be uploaded by the base station, or uploaded by the relay node and the terminal through the base stations to which the relay node and the terminal are connected. Based on the information uploaded by the base station and/or the relay node and/or the terminal and/or the information pre-stored by the system, the cooperative node determines the source of the interference signal, and generates and outputs a modulation scheme for the base station and/or the relay node connected with the base station, so as to reduce the receiving noise of the terminal, thereby alleviating the interference received by the terminal.

The interaction of information in the cooperative system can take place in the following paths.

Path 1: Base Station (e.g., Base Station 4011) and Relay Node 403.

(1) The relay node 403 attempts to connect with a surrounding base station. Then the base station 4011 feeds back information to the relay node 403. Then the relay node 403 successfully accesses the base station 4011, completing the information exchange for initializing connection, and then can communicate with the base station 4011.

(2) The base station 4011 communicates with a terminal (e.g., terminal 4021 and/or terminal 4022) through the relay node 403. Then the base station 4011 sends codebook control information, physical state adjustment information, etc., required by the relay node 403 to the control module 4031 of the relay node 403.

(3) The cooperative node 404 requests to adjust the physical state of the relay node 403. Then the base station 4011 forwards the regulation requirement of the cooperative node 404 to the relay node 403, or the base station 4011 interprets the regulation requirement and generates updated relay node control information, and then outputs the updated relay node control information to the relay node 403.

(4) If the relay node 403 has an autonomous regulation function, the codebook or physical position change related information generated at the relay node 403 needs to be sent to the base station 4011 so that the base station 4011 can update accordingly.

(5) If the relay node 403 has a signal receiving and processing function, the information received by the relay node 403 needs to be sent to the base station 4011 for sensing, positioning and so on by the base station 4011.

Path 2: Base Station (e.g., Base Station 4011) and Terminal (e.g., Terminal 4021)

(1) The terminal attempts to access a surrounding base station so as to connect with the surrounding base station. Then the base station accepts the access request of the terminal. Then the terminal successfully accesses the base station, completing the information exchange for initializing connection, and then the terminal can communicate with the base station.

(2) Data communication is conducted between the base station and the terminal.

(3) When the communication quality of the terminal is poor, the terminal may report communication quality information to the base station, which may include signal-to-noise ratio (SNR), timing advance (TA), communication beam ID, SSB information of other base stations, etc.

(4) The base station requests the terminal to send or test designated information, which may be used to verify the interference source. Then the terminal sends the designated information to the base station, or the terminal feeds back the test result to the base station after testing the designated information.

(5) After an interference reduction scheme of the cooperative node is performed, the terminal tests and feeds back an improved result (for example, a result of performing the interference reduction scheme, such as quality of the test signal, e.g., SNR of the test signal) to the base station.

Path 3: Base Station (e.g., Base Station 4011) and Cooperative Node (e.g., Cooperative Node 404)

(1) The initialization information of the base station is uploaded to the cooperative node, or the declination angle update information of the base station is uploaded to the cooperative node, or the ID/codebook information of the relay node connected with the base station is uploaded to the cooperative node.

(2) The information acquired from the terminal with poor communication quality is forwarded to the cooperative node, which may include SNR of the terminal, TA, communication beam ID, SSB information of other base stations, etc.

(3) After the cooperative node finishes preliminarily determination of the interference source, the cooperative node informs the base station of how to verify the interference source.

(4) The cooperative node notifies the base station of the adjustment scheme after confirming the adjustment scheme (e.g., interference reduction scheme/interference management scheme).

(5) The base station sends the result of performing the interference reduction scheme collected from the terminal to the cooperative node.

In various embodiments of the present disclosure, a signal received by the terminal 4021 includes a superposition of signal 4 as interference information and signal 3 as effective information, as shown in FIG. 4. When the energy of the signal 4 is large, part of the content of the signal 3 may be damaged or cancelled by the signal 4, resulting in that the terminal 4021 cannot identify all or part of the effective information transferred by the signal 3, leading to poor voice quality. Alternatively, the signal 4 may amplify useless noise signal in the signal 3, resulting in a lot of useless or erroneous information being doped in the information received by the terminal 4021.

In order to ensure that the terminal 4021 can accurately receive the information transmitted by the base station 4011, it is necessary to measure the quality of the received signal of the terminal 4021, wherein what is to be measured may be signal-to-noise ratio (SNR) of the transmitted data and signal-to-interference plus noise ratio (SINR). The received signal is a superposition of signal 3 and signal 4. When the test noise of the received signal of the terminal 4021 exceeds a certain threshold, or the SNR/SINR is lower than a certain threshold, it can be considered that the accuracy of the transmitted data is poor, and the base station 4011 needs to manage the transmission channel or environmental interference channel, so as to improve the transmission quality of useful information. The management of the transmission channel may be to switch the beam for connecting the base station and the terminal, or may be to cause the base station to communicate with the terminal through the relay node, thereby bypassing the obstacles that leads to large transmission loss. When the base station 4011 receives the information with poor signal quality fed back by the terminal 4021, if it attempts to improve by means of transmission channel management for plenty of times (the number of times may be determined by the base station), and the feedback data reported by the terminal indicates that the improvement of the signal quality is not obvious and still cannot meet the requirements for quality threshold of transmission, then this problem can be solved by means of cooperation among base stations, which may be achieved at the cooperative node 404 connected in common by the base stations. The quality threshold may be set by the terminal based on the resolving capability of the receiver of the device itself, or may be set dynamically based on the results of previous tests (e.g., a fitting curve may be generated according to the correspondence between the previous signal quality and the received bit error rate so as to predict the minimum threshold of signal quality required for the current transmission), or may be directly configured by nodes such as base stations, core networks, etc., or may be set by combining the above plurality of schemes. The specific way for the terminal to feedback information on poor signal quality (such as interference-related problems) may be that, the terminal carries interference-related feedback information in an uplink physical channel, which may include one or more of beam direction or direction code of the interference, position of the interference measured by the terminal, time information of the interference, etc., wherein the uplink physical channel may be at least one of: uplink control channel, uplink shared channel, etc.

By means of the method described above, and by means of the comprehensive adjustment of cooperative nodes, the interference caused by the introduction of relay nodes may be reduced or deleted to improve the quality of information transmission/reception. In addition, a step of interference source verification may be selectively added, so as to further improve the accuracy of the interference management scheme.

Figure 8:
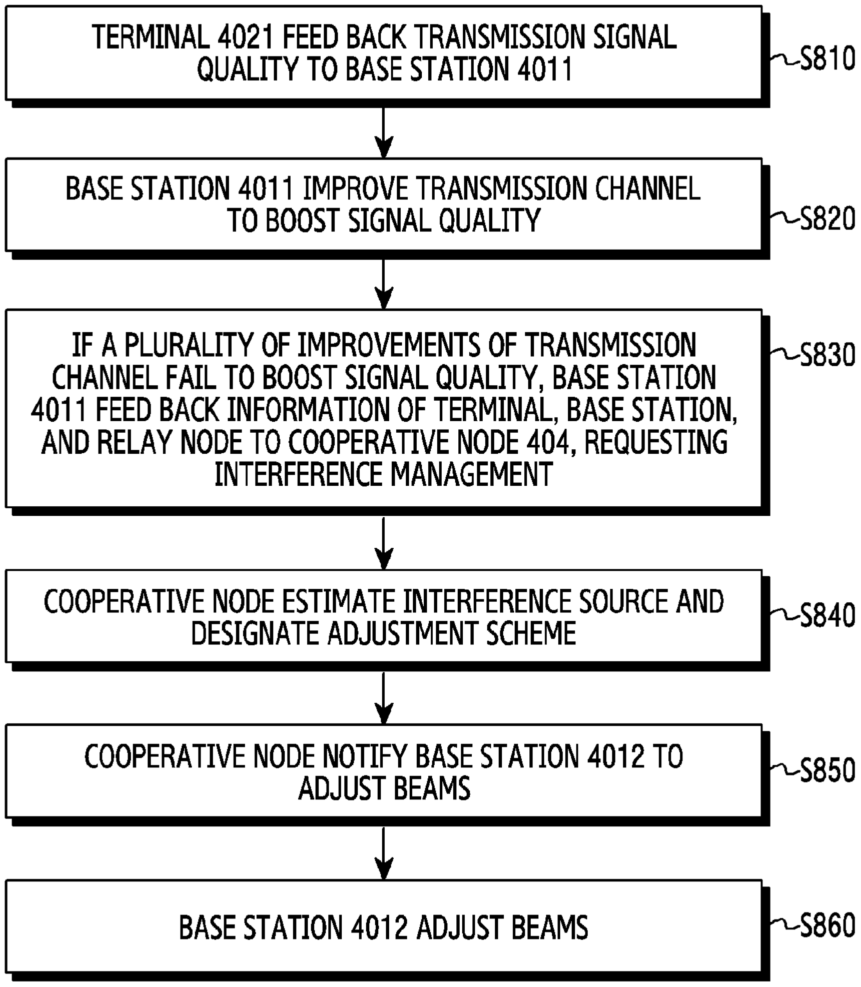
FIG. 8 illustrates a flowchart of a cooperative approach for interference management according to various embodiments of the present disclosure.

FIG. 8 illustrates a flowchart of a cooperation approach for interference management according to various embodiments of the present disclosure.

The main steps included in FIG. 8 are as follows.

Step S810: The terminal 4021 sends uplink information to the base station 4011, wherein the uplink information includes at least one of the following information: quality information of downlink signal tested by the terminal 4011, information (e.g., SSB ID, CSI-RS ID, etc.) of beam (e.g., transmission beam) for communication with the base station 4011, information (e.g., TA) of distance between the base station 4011 and the terminal 4021, etc., the uplink information is used to inform the base station 4011 that the transmission signal quality of the terminal 4021 needs to be improved.

Step S820: The base station 4011 attempts to improve the transmission channel. The terminal feeds back the signal quality after the improvement.

Step S830: If it attempts to improve by means of transmission channel management for plenty of times (the number of times may be determined by the base station), and the feedback data reported by the terminal indicates that the improvement of the signal quality is not obvious and still cannot meet the requirements for quality threshold of transmission, then the base station 4011 reports information to the cooperative node 404, wherein the information includes information related to the base station 4011, the relay node 403 and the terminal 4021, and interference information required by the cooperative nodes, and the information is used to request the cooperative node 404 to solve the interference problem of the terminal 4021.

Step S840: The cooperative node 404 estimates a possible source of interference (e.g., the possible source may be the base station 4012) and formulates a solution (e.g., an adjustment scheme for interference management), based on the existing information, or the (e.g., updated) information previously reported by all base stations (including the base station 4011, and other base stations within the serving range of the cooperative node 404, e.g., the base station 4012), in order to reduce the influence of the signal 4 on the terminal 4021.

Step S850: The cooperative node 404 sends a beam adjustment instruction to the adjusted base station (e.g., base station 4012) and/or sends the beam adjustment instruction to the relay node 403 in communication with the base station 4012 through the base station 4012. The beam adjustment instruction is used to realize the beam adjustment for the base station 4012 and/or the relay node 403 and perform interference management, so as to solve the inter-cell interference problem for a specific terminal (e.g., terminal 4021).

Step S860: The base station 4012 and/or the relay node 403 execute the beam adjustment instruction of the cooperative node 404.

Step S840 in which the cooperative node 404 estimates the possible source of interference may be implemented by the following steps:

(1) Estimation of spatial position of the terminal 4021: based on the information reported by the base station 4011 to the cooperative node 404 in step S830 and the information related to other nodes stored by the cooperative node 404, the approximate position of the terminal 4021 in space is estimated, and then the position and angle of the terminal 4021 relative to other nodes are obtained.

Through the method described in connection with FIG. 8 and by means of interference management of cooperative nodes, the interference to the terminal caused by the introduction of relay nodes may be reduced or deleted, so as to improve the quality of information transmission/reception.

Figure 9:
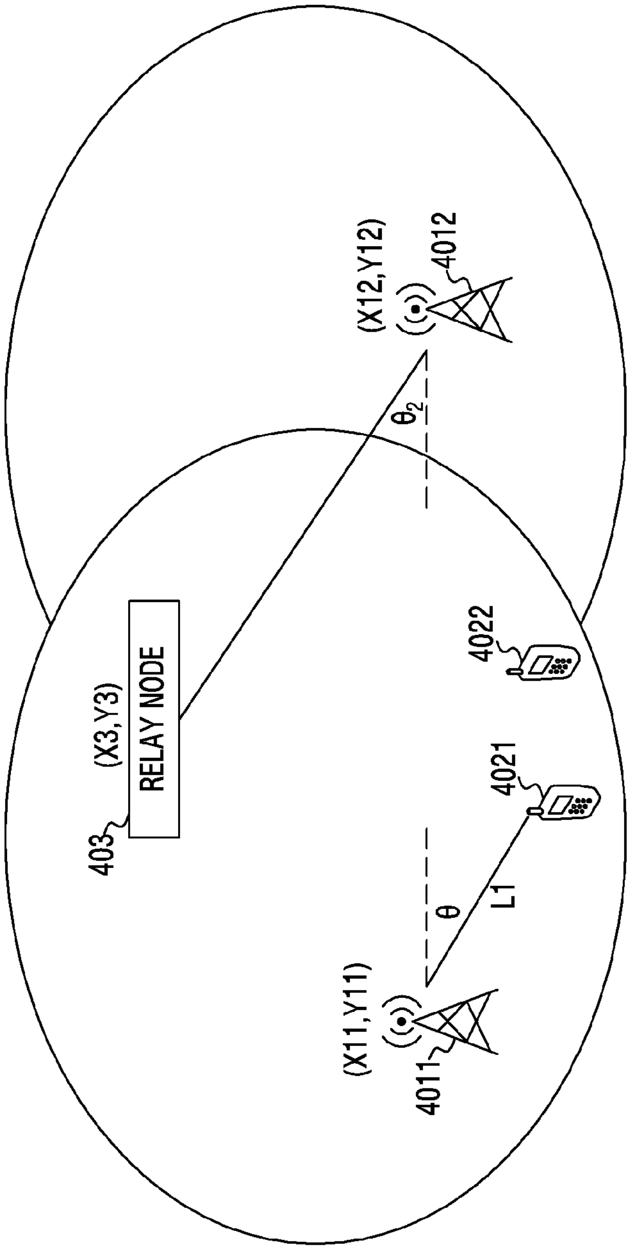
FIG. 9 illustrates an example of a relative angle calculation method according to various embodiments of the present disclosure.

FIG. 9 illustrates an example of a relative angle calculation method according to various embodiments of the present disclosure.

The physical placement positions of nodes in space may be easily identified by establishing a two-dimensional coordinate system. As shown in FIG. 9, the position of the base station 4011 is (x11, y11), the position of the base station 4012 is (x12, y12), and the position of the relay node 403 is (x3, y3). All the standard angles take the horizontal direction as the 0°. In step S810, the uplink information sent by the terminal 4021 to the base station 4011 includes information related to the communication beam ID and the transmission distance TA of the base station 4011, and the angle θ and the distance L1 of the terminal 4021 relative to the base station 4011 may be obtained correspondingly. Accordingly, the coordinates of the spatial position of the terminal 4021 may be calculated as (x11+L1*cos θ, y11−L1*sin θ). The angle and distance of the terminal 4021 relative to other nodes may be calculated through this method. The relative angle θ2 between the base station 4012 and the relay node 403 is arctan ((x12−x3)/(y3−y12)).

According to the above calculation method, the relative angle and position relationship between all nodes within the management scope of the cooperative nodes may be obtained.

(2) Calculation of the connecting path of other base station (e.g., base station 4012) in an adjacent cell via the relay node 403: based on the physical positions and states of the relay node 403 and other base stations pre-stored by the cooperative node 404, the incident angle of the beam of the other base station with respect to the relay node 403 and the distance between the other base station and the relay node 403 is determined. Then, based on control codebook of the relay node 403 uploaded by the base station (e.g., base stations 4011 and/or 4012), and correspondence between codebook of the relay node 403 and, incident and outgoing beams of the relay node 403, pre-stored by the cooperative node 404, the outputting direction and path (e.g., signal transmission path) of the signals (e.g., beams) of other base station after arriving at the relay node 403 and after the signal enhancement are determined.

(3) Compared with the spatial position of the base station 4021, the possibility that the path of the interference enhancement possibly caused by the transmitting node (e.g., other base station 4012) overlaps with the terminal 4021 is determined, and the interference source (e.g., other base station 4012) is estimated.

In some examples, in order to reduce the amount of calculation for interference source estimation, priorities for calculation of interference source estimation may be designed. For example, adjacent cell base stations may be ranked according to the distance from the relay node 403, and whether each adjacent cell base station is the interfering base station for the target user (e.g., terminal 4021) may be estimated in the descending order of the distances, that is, the interference of the nearest base station to the system is calculated first and determination is made, until the interfering base station is found, wherein the interference beam of the interfering base station passes through the position of the target user.

The adjustment scheme for interference management in step S840 may be at least one of the following methods:

First method: The interfering base station (e.g., base station 4012) is configured to avoid sending downlink signals in the direction associated with signal 4, and the information used to inform this scheme may be called "third indication information."

Second method: The interfering base station 4012 reduces the transmission power in the direction associated with signal 4. The reduction of transmission power may be stepwise reduction (e.g., the value of power offset gradually decreases) until the signal quality tested by the target terminal 4021 meets the transmission requirements, or alternatively, the value of power offset of transmission power reduction may be calculated by the base station 4011 and/or the cooperative node 404 based on the signal-to-noise ratio fed back by the terminal 4021. Information for notifying such scheme may be called "fourth indication information."

Third method: The physical state (which may also be referred to as a "spatial state") of the relay node 403 is adjusted and the configuration signaling of the relay node 403 is updated. The physical state may include at least one of the spatial position (which may also be referred to as a "physical position," for example, altitude, direction, position, and the like) of the relay node 403, and the relative position or angle between the sub-modules of the relay node 403. The amount of adjustment of the physical state is related to the hardware design of the relay node 403. After the physical state of the relay node 403 is adjusted, in order to guarantee the communication requirements of the original terminal 4022, the configuration signaling of the relay node 403 needs to be updated, which may be achieved either at the cooperative node 404 or at the connecting base station 4011 of the relay node 403. The cooperative node 404 configures the modulation signal of the relay node 403, sends the modulation signal to the relay node 403 through the connecting base station 4011 of the relay node 403, changes the route and/or direction in which the interference signal 4 is transmitted within the cell, and prevents the signal 4 from overlapping with the receiving position of the terminal 4021.

In the first method and the second method, the interference is resolved by adjusting the interfering base station 4012, and the methods only require transmitting beam information (e.g., a beam ID) to avoid or reduce the transmission power from the cooperative node 404 to the interfering base station 4012, and/or reducing the value of the transmitted power or the value of power offset. The first method and the second method do not involve much adjustment, so that signalling overheads are small. In the third method, the interference is resolved by adjusting the relay node 403. The adjustment information of the relay node 403 is transmitted from the cooperative node 404 to the connecting base station 4011 of the relay node 403, and then, is transmitted to the relay node 403 by the connecting base station 4011 of the relay node 403. What is transmitted by the cooperative node 404 can be the physical state adjustment information of the relay node 403 and/or the configuration signalling (for example, the codebook information or codebook indication information) of the relay node 403. The third method may not cause restriction on the output beams of the interfering base station, and may not affect the communication between the terminal 4023 in the direction of the interference beam and the interfering base station 4012. Moreover, by adjusting the physical position and codebook of the relay node 403, the base station 4011 can continue to communicate with the terminal 4022 through the relay node 403, and at the same time, the interference beam may not cause interference to the target terminal 4021 after being forwarded by the relay node.

When choosing which adjustment scheme for interference management to employ, it is required to consider whether other terminals (e.g., terminal 4022) served by the adjusted base station 4012 and relay node 403 may be affected. If a plurality of schemes is feasible, the scheme with less adjustment may be preferred, or any scheme of various schemes may be preferably selected. This is not limited in the present disclosure. The relevant information of the adjustment scheme may be carried in the downlink control channel or the downlink shared channel. After the adjustment scheme for interference management is performed, the output energy of the base station 4012 in the interfering direction is reduced, the interference received by the terminal 4021 is reduced, and the communication quality of the terminal 4021 is improved.

Optionally, the terminal 4021 may feedback the signal quality after the improvement to the cooperative node 404 through the base station 4011 to confirm that this improvement scheme is feasible. Alternatively, if the signal-to-noise ratio of the terminal 4021 is improved a little, the terminal 4021 may request the cooperative node 404 to improve or change the adjustment scheme for interference management.

On the basis of the cooperation approach for interference management shown in FIG. 8, a step of interference source verification may be added in S840 to improve the efficiency and accuracy of improvement of the signal quality of the terminal 4021. Next, the added step will be described in connection with FIG. 10. The added step may be that: the cooperative node 404 is configured to transmit a test signal for verifying the interference source between the interfering base station (e.g., base station 4012) and the target user (e.g., terminal 4021), and the test signal of the target user 4021 needs to be configured through its connecting base station 4011. The transmission path of the test signal is: terminal 4021—relay node 403—interfering base station 4012 estimated in step S840, and/or interfering base station 4012—relay node 403—terminal 4021. The interfering base station 4012 or the target user 4021 analyzes the received test signal, or compares the received test signal with a specific value in order to verify the accuracy of the estimation result of the interference source. The analysis, comparison and verification process may be completed at the terminal 4021 or the interfering base station 4012, or may be uploaded to the cooperative node 404 by the interfering base station 4012 and be completed at the cooperative node 404. The accuracy of interference management scheme may be further improved by selectively adding the step of interference source verification.

Figure 10:
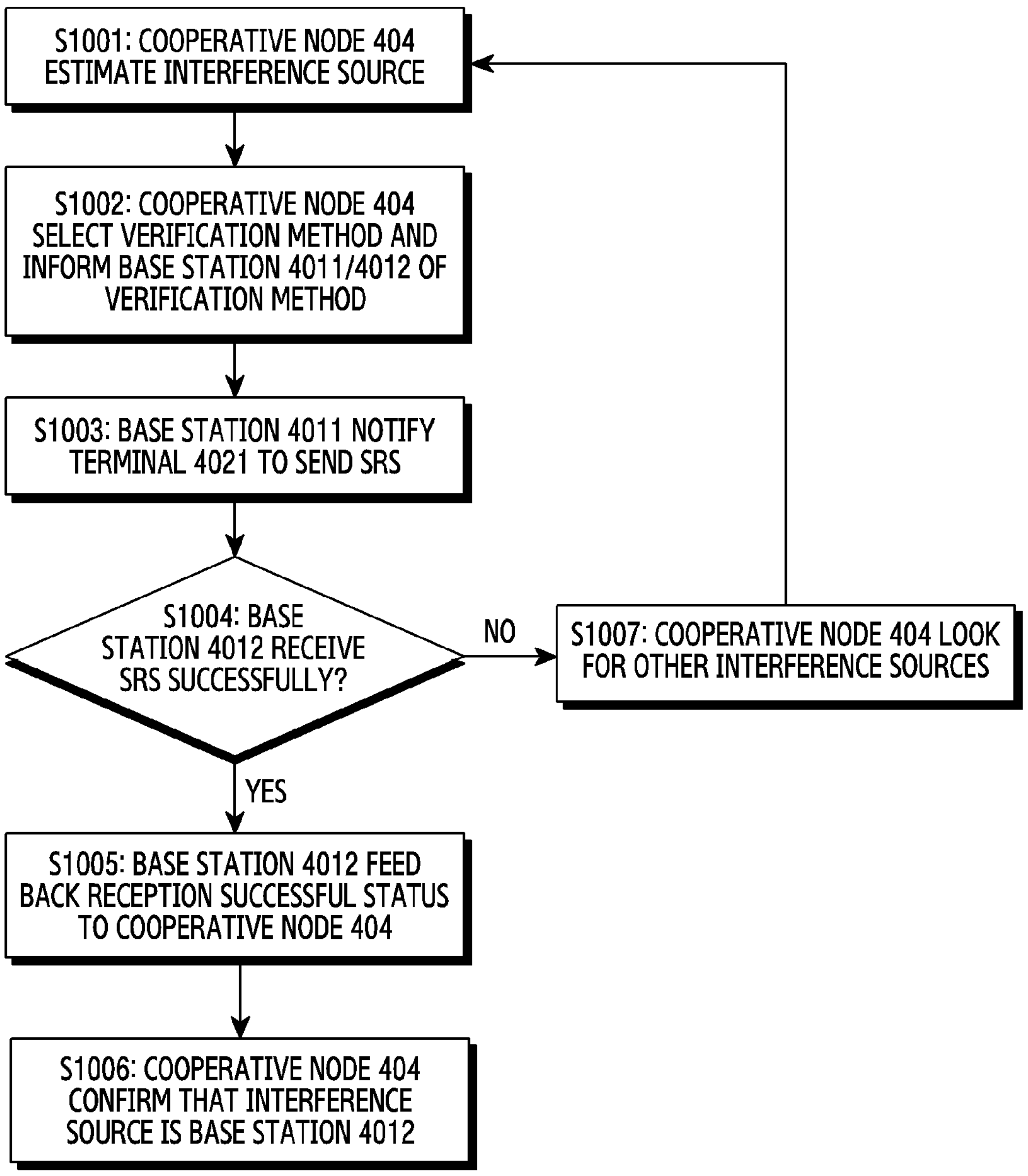
FIG. 10 illustrates a flowchart of a verification approach for interference source according to various embodiments of the present disclosure.

FIG. 10 illustrates a flowchart of a verification approach for an interference source according to various embodiments of the present disclosure.

As shown in FIG. 10, in step S1001, the cooperative node 404 estimates the interference source. The way in which the cooperative node 404 estimates the interference source is the same as the way in which the cooperative node 404 estimates the interference source in step S840, and will not be detailed here.

In step S1002, the cooperative node 404 selects a verification method, and notifies the base station 4011 and the interfering base station 4012 connected with the terminal 4021 of the verification method. What is notified includes the transmitted data, the transmitting direction, the transmitting node, the form of the transmitted test signal, the receiving node, the way in which the receiving result is fed back, and the parameters for comparing the receiving result.

If the cooperative node 404 configures the interfering base station 4012 to send a test signal (also called a verification signal), the terminal 4021 receives the test signal, and conveys the receiving result of the test signal to the cooperative node 404 through the base station 4011, and the content of the transmitted test signal may be a zero power channel state information-reference signal (zero power CSI-RS). The base station 4011 notifies the terminal 4021 to measure SNR or SINR, and compares the measured SNR and SINR with the SNR or SINR when no zero-power CSI-RS is transmitted. The comparison process may be completed at the terminal 4021, or may be facilitated to be conducted by the base station 4011 by the terminal 4021 reporting the SNR and SINR, or may be facilitated to be conducted by the cooperative node 404 by the base station 4011 reporting the SNR and SINR to the cooperative node 404. If the amount of change in SNR/SINR before and after sending zero-power CSI-RS is greater than a specified threshold, the interfering base station is confirmed as the base station 4012, and the cooperative node performs step S850 for interference management. If the amount of change in SNR/SINR before and after sending zero-power CSI-RS is less than a specified threshold, it is required to perform step S840 again for estimating and verifying the interference source. The specified threshold is related to environmental and equipment fluctuation factors such as test error of the terminal 4021, transmission path interference fluctuation, etc.

If the cooperative node 404 configures the terminal 4021 to send a test signal (also called a verification signal), the base station 4012 receives the test signal and reports the receiving result of the test signal to the cooperative node 404. The content of the test signal may be an uplink sounding reference signal (SRS).

In step S1003, the base station 4011 notifies the terminal 4021 to send an SRS signal (which may be called a “first signal”).

If the estimated interfering base station 4012 may test and resolve (e.g., detect) the SRS (e.g., or ZP CSI-RS) signal of the terminal 4021 in step S1004, it is confirmed that the interference source is the base station 4012. Then in step S1005, the base station 4012 reports the test (e.g., measurement) result of the received SRS signal (which may be called “first measurement related information”) to the cooperative node 404, so that the cooperative node 404 performs step S850 for Interference management. Alternatively, the base station 4012 may generate information (which may be called “first indication information”) indicating whether the base station 4012 is an interfering base station based on the test (e.g., measurement) result of SRS (e.g., or ZP CSI-RS), and send this information to the cooperative node 404. If the estimated interfering base station 4012 fails to detect the SRS signal sent by the terminal 4021 in step S1004, it is required to re-preform step S840 in order to estimate and verify the interference source. If the energy of the interference signal caused by the base station 4012 to the terminal 4021 is weak, which is less than the energy of the noise and environmental interference of channel transmission, the base station 4012 may not be able to separate the noise and SRS signal from the data, resulting in a failure to accurately determine whether the reception is successful. At this time, it is required to choose another verification method, or not to perform the step of verification.

If the terminal 4021 can test (e.g., detect) a SSB signal sent by other base station than the connecting base station 4011 (which may be called a “second signal,” SSB consisting of three parts: primary synchronization signal (PSS), secondary synchronization signal (SSS) and PBCH)), a SSB signal sent by other base station can also be used as evidence to verify the interference source. This SSB signal may not need to be configured by the cooperative node 404 to be sent by BS2 separately. The terminal 4021 may report the SSB result of measuring BS2 (which may be called second measurement related information) when performing the operation of sending uplink information to the base station 4011 in step S810, or alternatively, the terminal 4021 may generate and report SSB result information (which may be called “second indication information”) indicating whether other base station is the interfering base station based on the SSB measurement result. Such method reduces the time and channel overhead required for the verification step.

Figure 11:
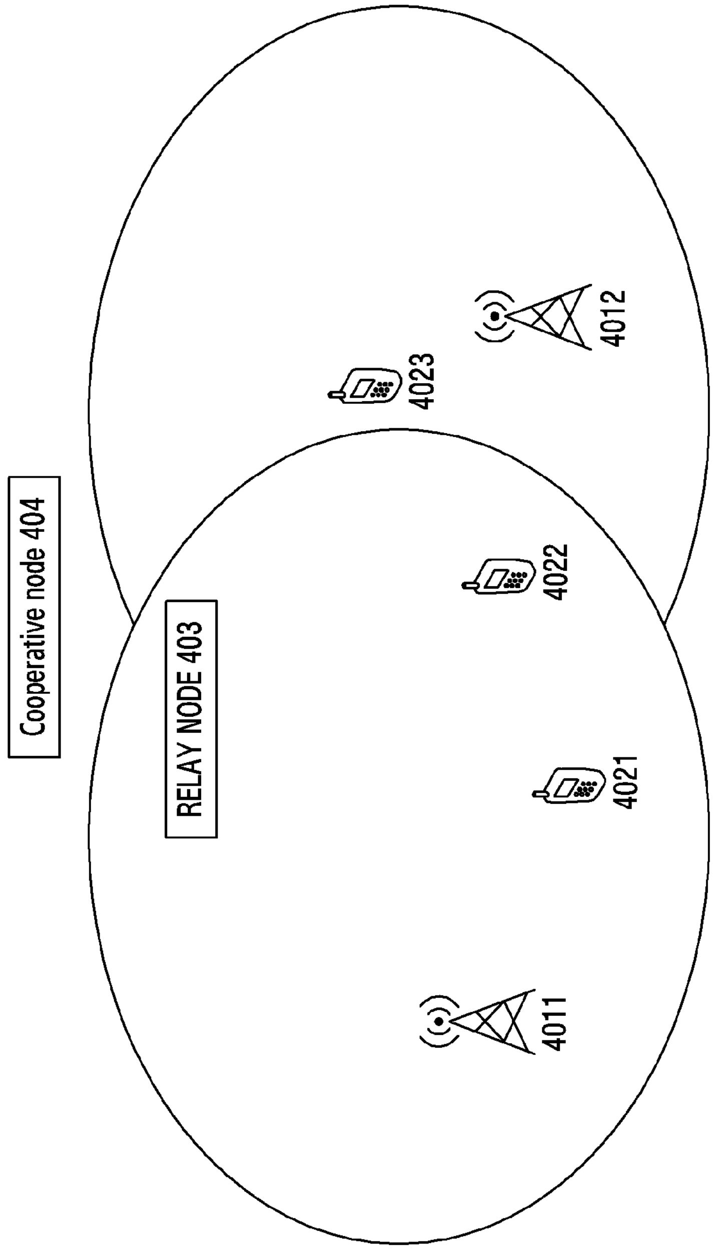
FIG. 11 illustrates an example of a scenario for interference management of a plurality of receiving nodes according to various embodiments of the present disclosure.

FIG. 11 illustrates an example of a scenario for interference management of a plurality of receiving nodes according to various embodiments of the present disclosure.

If there is a requirement for communication connection of the terminal 4023 in the direction associated with the signal 4, the communication connection of the terminal 4023 may be affected if the base station 4012 avoids or reduces energy output in this direction, as shown in FIG. 11.

Figure 12A:
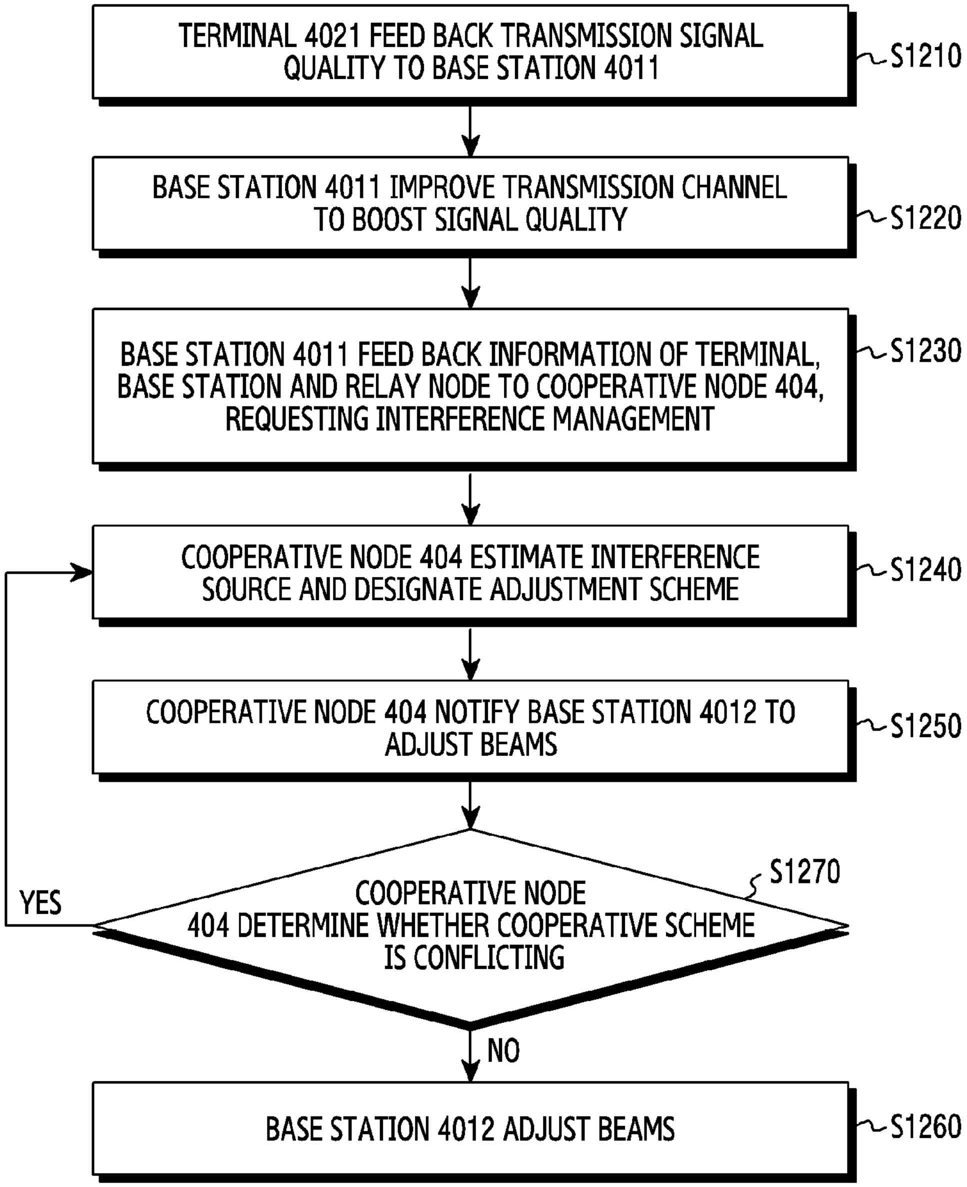
FIG. 12A illustrates a flowchart of a method for interference management of a plurality of groups of receiving nodes according to various embodiments of the present disclosure.

In order to give consideration to the communication quality of a plurality of terminals (4021/4022/4023) concurrently, after the step of S850 is performed, a feedback step of the interfering base station may be added, as shown in FIG. 12A.

FIG. 12A illustrates a flowchart of a method for interference management of a plurality of groups of receiving nodes according to various embodiments of the present disclosure. Steps S1210, S1220, S1230, S1240, S1250 and S1260 in FIG. 12A are the same as steps S810, S820, S830, S840, S850 and S860 in FIG. 8, respectively. The difference between FIG. 12A and FIG. 8 is that there is a step S1270 after step S1250 and before step S1260. In step S1270, the base station 4012 may feed back to the cooperative node 404 whether the base station 4012 can meet the beam adjustment requirements this time, based on the direction of the connection beam of the currently served terminal 4023. If there is a communication need for the terminal 4023 in this direction, the cooperative node 404 determines that the interference management scheme may lead to a collision and the beam cannot be adjusted, then the interfering base station 4012 may request the cooperative node 404 to change the interference management scheme. For example, the cooperative node 404 may adjust the direction in which the signal 4 as an interference signal is enhanced by adjusting the relay node 403. Thus, the method proceeds to step S1240, otherwise to step S1260.

Alternatively, when the base station 2 performs transmission reducing power in the interference direction, the terminal 4023 feeds back a problem of communication quality deterioration, and the base station 2 reports it to the cooperative node, so that the cooperative node 404 changes the interference management scheme.

The ratio of energy of the incident beam of the base station 4011 received by the relay node 403 is related to the relative position and angle of the relay node 403 relative to the transmitting base station 4011 to which the node is connected. In order to maximize the energy efficiency of the relay node 403 in absorbing incoming waves, converting and transmitting, the relay node 403 is usually set at an optimal incident angle, such as 45° oblique incidence, relative to the base station 4011, by comprehensively considering the occlusion of the base station 4011, the influence of the sweeping range of the relay node 403, etc. When the relay node 403 communicates with different base stations, it will follow this design principle, so that the relay node 403 adjusts the direction of the transmission module 4032 of the relay node 403 according to the direction of the input beam, and after the adjustment, updates such change (e.g., adjustment of the direction of the transmission module 4032 of the relay node 403) to the cooperative node 404 through the base station 4011 to which the node is connected.

The direction of the output beam of the relay node 403 is related to the control codebook and incident wave angle. For the same input beam, if the configuration signaling of the base station for the relay node 403 changes, the direction in which the output beam of the relay node 403 enhances may also change. Therefore, in various embodiments of the present disclosure, in order to maintain the communication of the terminal 4023, and the beam energy of the signal 4 from the base station 4012 to the relay node 403 remains unchanged, the output direction of the interfering signal 4 after being forwarded by the relay node 403 may be adjusted by changing the codebook of the relay node 403. However, if only the codebook of the relay node 403 is changed, the direction of the signal 2 may be adjusted accordingly, and the communication of the terminal 4022 may be interrupted.

The cooperative node 404 may solve the interference problem of the terminal 4021 by adjusting the physical position of the relay node 403 and providing control signaling to the relay node 403. Such adjustment signaling and adjustment scheme for physical position need to be given by the cooperative node 404 and sent to the control module 4031 of the relay node 403 through the base station 4011 connected with the relay node 403. If the position or angle of the relay node 403 is adjusted, the input beam angle of the base station 4011 relative to the relay node 403 may also change. In order to guarantee the connected state of the terminal 4022, the beam direction of the signal 2 after being forwarded by the relay node 403 needs to point to the terminal 4022. At this time, the input and output phase compensation matrix parameters may be calculated from the coordinate information of the spatial position of the terminal 4021, so as to calculate a phase matrix required to be compensated by the relay node 403 and a corresponding codebook. This codebook calculation process may be performed at the cooperative node 404, and the calculated codebook may be transmitted to the relay node 403 through the base station 4011. This codebook calculation process may also be performed at the base station 4011 based on the adjustment instruction of the physical position given by the cooperative node 404, and the calculated codebook may be sent to the relay node 403 and the cooperative node 404.

For a complex network including a plurality of terminals and a plurality of base stations, it is required to consider the interference information of each network and determine the optimal physical position and codebook adjustment scheme for the relay nodes.

Optionally, the aforementioned adjustment of physical position may also be adjustment of the physical positions of the transmitting node and the terminal, such as fine adjustment of declination angle of the base station, position, or angle of the terminal. The adjusted information needs to be updated to the cooperative node 404 for subsequent interference management by the cooperative node 404.

Optionally, after the communication of the terminal 4022 ends, the current cooperation is finished, and the relay node 403 may return to the physical position where the transmission efficiency is maximized.

Figure 12B:
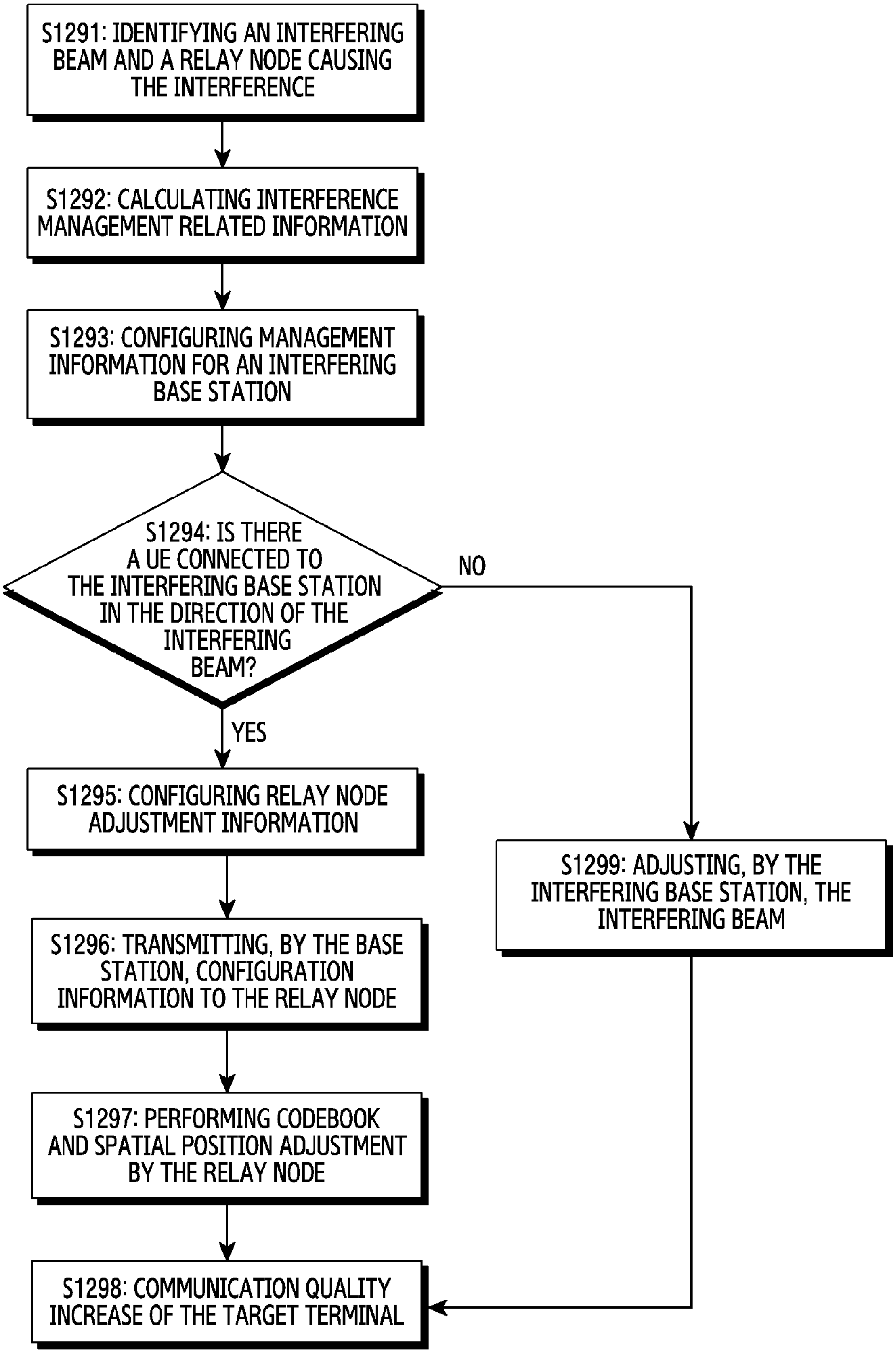
FIG. 12B illustrates a flowchart of a method for interference management of a plurality of groups of receiving nodes according to various embodiments of the present disclosure.

In another embodiment, the base station 4012 acts as the cooperative node 404, and the process of the scenario is shown in FIG. 12B. FIG. 12B is a flowchart illustrating a method for interference management of a plurality of groups of receiving nodes according to various embodiments of the present disclosure. In step S1291, the cooperative node 404 (e.g., the base station 4012) obtains information on the base station 4011 connected thereto and the relay node 403 connected to the base station 4011, and based on a combination of the information on the base station 4011 and the relay node 403 connected to the base station 4011 and information related to the interfered target terminal 4021, identifies the interference beam (e.g., determines interference beam information) and information on the relay node causing the interference. In step S1292, the interference management method and interference management related information are determined, for example, the first interference management method is selected to avoid the use of the interference beam, and the information on the beam to be avoided, such as a beam index, is determined. In step S1293, the adjustment information for the interfering base station is configured. Before the cooperative node 404 (e.g., the base station 4012) performs the interference management method, in step S1294, the cooperative node 404 may perform a determining step based on the known information of the terminals connected to the base station 4012. If it is determined that there is no terminal (UE) connected to the base station 4012 in the direction of the interference beam, as shown in the scenario in FIG. 5, the cooperative node 404 (e.g., the base station 4012) performs the first interference management method, that is, performs step S1299 to avoid using the interference beam, thus resolving the interference of the base station 4012 to the terminal 4021. If it is determined that there is a terminal 4023, which is connected to the base station 4012 through the interference beam, as shown in FIG. 11, then avoiding the transmission of the interference beam in the first interference management method may cause the quality degradation of communication between the terminal 4023 and the base station 4012. At this time, the cooperative node 404 (e.g., the base station 4012) can switch the interference management method to another method, such as the third method, that is, in step S1296, the interference management related information is transmitted to a base station of a serving cell of the relay node 403, and the base station of the serving cell of the relay node 403 transmits corresponding physical position adjustment information and configuration signaling to the relay node 403. In step S1297, the relay node 403 performs codebook adjustment and spatial position adjustment to resolve the problem of the interference caused by the base station 4012 to the terminal 4021, so as to improve the quality of communication of the target terminal in step S1298.

Figure 13:
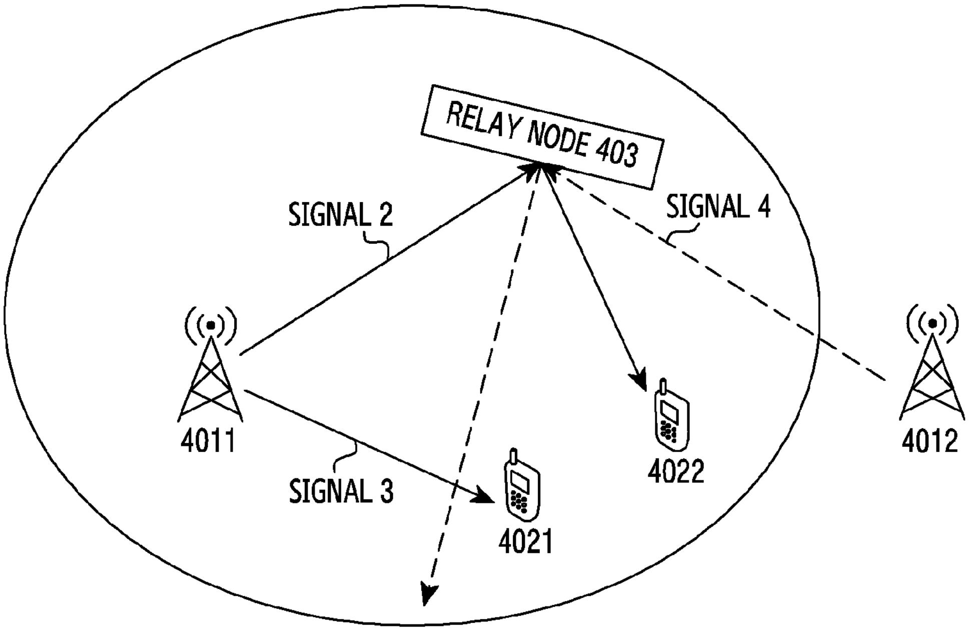
FIG. 13 illustrates an example of a scenario after interference management adjustment of a plurality of groups of receiving nodes according to various embodiments of the present disclosure.

FIG. 13 illustrates an example of a scenario after interference management adjustment of a plurality of groups of receiving nodes according to various embodiments of the present disclosure. As shown in FIG. 13, the signal 4 of the base station 4012 arriving at the relay node 403 is enhanced in a specified direction after being forwarded by the relay node 403, and does not pass through the terminal 4021, thereby no longer causing interference to the terminal 4021.

Figure 14:
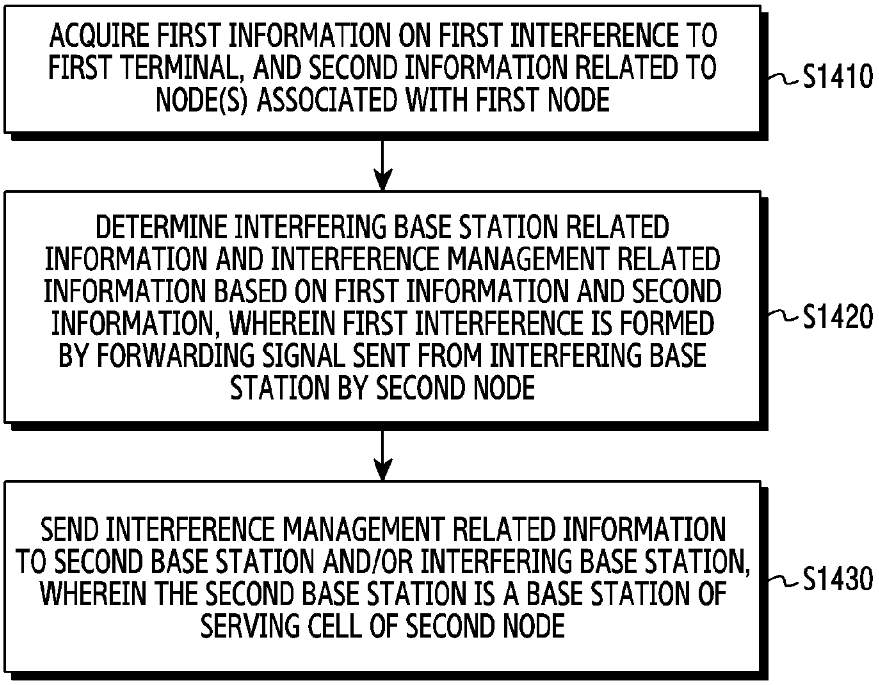
FIG. 14 illustrates a flowchart of a method performed by a first node according to various embodiments of the present disclosure.

FIG. 14 illustrates a flowchart of a method performed by a first node according to various embodiments of the present disclosure. In step S1410, a first node acquires first information on a first interference to a first terminal and second information related to node(s) associated with the first node. In step 1420, the first node determines interfering base station related information and interference management related information based on the first information and the second information, wherein the first interference is formed by forwarding a signal sent from an interfering base station by a second node. In step S1430, the first node sends the interference management related information to the second base station and/or the interfering base station, wherein the second base station is a base station of a serving cell of the second node. The interfering base station related information and interference management related information are determined based on the first information and the second information, wherein the first interference is formed by forwarding a signal sent from the interfering base station by the second node; the interference management related information is sent to the second base station and/or the interfering base station, wherein the second base station is a base station of a serving cell of the second node.

For example, the node associated with the first node includes at least one of: the second node, a first base station, the second base station, at least one third base station, wherein the first base station is a base station of a serving cell of the first terminal, the third base station is other base station managed by the first node than the first base station, or a base station managed by other node connected with the first node, and the at least one third base station includes the interfering base station. For example, the first information includes at least one of the following information: identification information of a first base station, information related to downlink beams sent by the first base station and received by the first terminal, information related to a distance between the first terminal and the first base station, and information related to quality of signals received by the first terminal; wherein the first base station is a base station of a serving cell of the first terminal.

For example, the second information includes at least one of the following information: information related to physical position of the node associated with the first node, and information related to codebook of the second node. For example, acquiring the second information comprises at least one of the following steps: acquiring information related to the node associated with the first node from the node; acquiring information of other nodes from the node associated with the first node. For example, determining interfering base station related information based on the first information and the second information comprises: estimating a spatial position of the first terminal based on the first information; determining a transmission path for a signal from the third base station and forwarded by the second node, based on the second information; determining that the third base station is the interfering base station for the first terminal, when the transmission path for the signal passes through the first terminal.

For example, the method further comprises: acquiring information related to a first measurement by the first terminal on a first signal sent from the third base station, and determining whether the third base station is the interfering base station for the first terminal based on the information related to the first measurement; or receiving first indication information for indicating whether the third base station is the interfering base station for the first terminal, wherein whether the third base station is the interfering base station for the first terminal is determined based on the information related to the first measurement by the first terminal on the first signal sent from the third base station; or acquiring information related to a second measurement by the third base station on a second signal sent from the first terminal, and determining whether the third base station is the interfering base station for the first terminal based on the information related to the second measurement; or receiving second indication information for indicating whether the third base station is the interfering base station for the first terminal, wherein whether the third base station is the interfering base station for the first terminal is determined based on the information related to the second measurement by the third base station on the second signal sent from the first terminal.

For example, the method further comprises: configuring the first terminal to send the first signal to the third base station through the first base station, and/or configuring the third base station to measure the first signal; or configuring the third base station to send the second signal to the first terminal, and/or configuring the first terminal to measure the second signal through the first base station. For example, sending the interference management related information to the interfering base station comprises at least one of: configuring a beam identification ID of the interfering base station corresponding to the first interference, and third indication information for indicating the interfering base station not to send downlink signals on configured beam ID; or configuring a beam identification ID of the interfering base station corresponding to the first interference, and fourth indication information for indicating the interfering base station to reduce transmission power for sending downlink signals on configured beam ID. For example, sending the interference management related information to the second node comprises: configuring physical position adjustment related information for the second node through the second base station.

For example, the method further comprises: acquiring an updated codebook for a second node to perform assistance communication for a terminal through the second node, wherein the updated codebook is determined based on the physical position adjustment related information. For example, the interference management related information is sent to the interfering base station first, and then the interference management related information is sent to the second base station after receiving indication information fed back by the interfering base station for indicating that the interference management related information is rejected.

By employing the method described in connection with FIG. 14 for interference management, the interference to the first terminal formed by forwarding the signal transmitted from the interfering base station by the second node (e.g., relay node) can be reduced/eliminated, thereby improving quality of signal transmission/reception for the first terminal.

Figure 15:
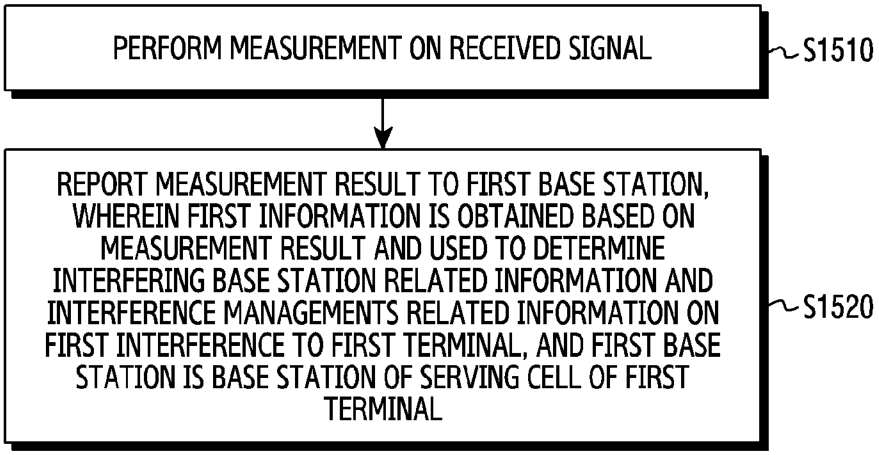
FIG. 15 illustrates a flowchart of a method performed by a first terminal according to various embodiments of the present disclosure.

FIG. 15 illustrates a flowchart of a method performed by a first terminal according to various embodiments of the present disclosure. In step 1510, the first terminal performs measurement on a received signal. In step 1520, the first terminal reports a measurement result to a first base station. For example, first information is obtained based on the measurement result, the first information is used to determine interfering base station related information and interference management information on a first interference to the first terminal, and the first base station is a base station of a serving cell of the first terminal.

For example, the method further comprises: sending a first signal to a third base station, wherein the first signal is used for being measured by the third base station, and whether the third base station is an interfering base station for the first terminal is determined based on a measurement result of the first signal; or receiving a second signal from a third base station and performing measurement on the second signal, wherein whether the third base station is the interfering base station for the first terminal is determined based on a measurement result of the second signal. For example, the method further comprises: sending first indication information to the first base station for indicating whether the third base station is the interfering base station for the first terminal; or sending the measurement result of the second signal to the first base station.

For example, if the first node (e.g., cooperative node) is not the first base station, the first indication information is sent to the first node by the first base station. Optionally, the method further comprises: in response to configuration of a first node through the first base station, performing at least one of the following operations: sending the first signal to the third base station, receiving the second signal from the third base station and measuring the second signal, and reporting the measurement result of the second signal to the first base station. For example, the verification on whether the third base station is the interfering base station may be implemented either at the first base station or at the first node (e.g., cooperative node).

By employing the method described in connection with FIG. 15 for interference management, the interference to the first terminal formed by forwarding the signal transmitted from the interfering base station by the second node (e.g., relay node) can be reduced/eliminated, thereby improving quality of signal transmission/reception for the first terminal.

Figure 16:
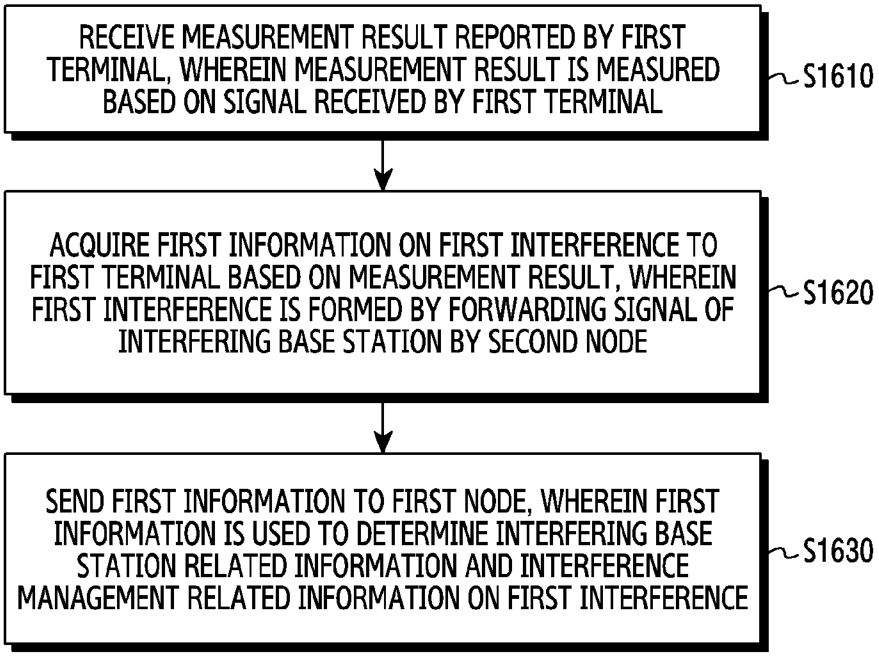
FIG. 16 illustrates a flowchart of a method performed by a first base station according to various embodiments of the present disclosure.

FIG. 16 illustrates a flowchart of a method performed by a first base station according to various embodiments of the present disclosure. In step S1610, the first base station receives a measurement result reported by a first terminal, wherein the measurement result is measured based on a signal received by the first terminal. In step S1620, the first base station acquires first information on a first interference to the first terminal based on the measurement result, wherein the first interference is formed by forwarding a signal of the interfering base station by the second node. In step S1630, the first base station sends the first information to a first node, wherein the first information is used to determine interfering base station related information and interference management related information on the first interference.

For example, the method further comprises: in response to configuration of the first node, configuring the first terminal to send a first signal to a third base station, and/or configuring the first terminal to measure a second signal received from a third base station, wherein the third base station is other base station managed by the first node than the first base station, or a base station managed by other node connected with the first node, and the third base station includes the interfering base station. For example, the method further comprises: receiving first indication information from the first terminal for indicating whether the third base station is an interfering base station for the first terminal; or receiving the measurement result of the second signal from the first terminal. If the first node (e.g., cooperative node) is not the first base station, the first indication information may be sent to the first node by the first base station, the measurement result of the second signal may also be sent to the first node, the first node may perform the verification, or the first base station may perform the verification, and indication information is sent to the first node.

By employing the method described in connection with FIG. 16 for interference management, the interference to the first terminal formed by forwarding the signal transmitted from the interfering base station by the second node (e.g., relay node) can be reduced/eliminated, thereby improving quality of signal transmission/reception for the first terminal.

Figure 17:
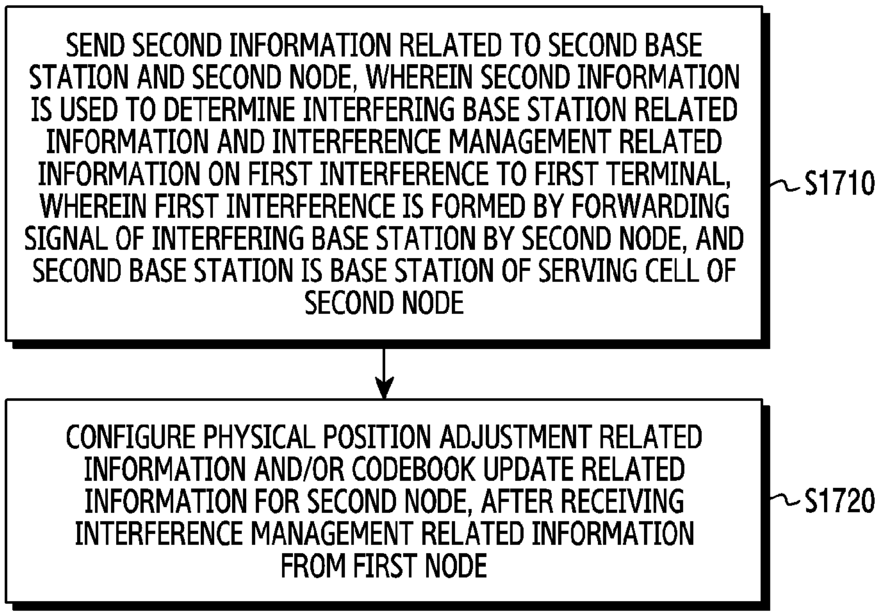
FIG. 17 illustrates a flowchart of a method performed by a second base station according to various embodiments of the present disclosure.

FIG. 17 illustrates a flowchart of a method performed by a second base station according to various embodiments of the present disclosure. In step S1710, the second base station sends second information related to the second base station and a second node to a first node, wherein the second information is used to determine interfering base station related information and interference management related information associated with a first interference to a first terminal, wherein the first interference is formed by forwarding a signal of an interfering base station by the second node, and the second base station is a base station of a serving cell of the second node. In step S1720, the second base station configures physical position adjustment related information and/or codebook update related information for the second node, after receiving the interference management related information from the first node.

For example, the method further comprises: sending the codebook update related information to the first node.

By employing the method described in connection with FIG. 17 for interference management, the interference to the first terminal formed by forwarding the signal transmitted from the interfering base station by the second node (e.g., relay node) can be reduced/eliminated, thereby improving quality of signal transmission/reception for the first terminal.

Figure 18:
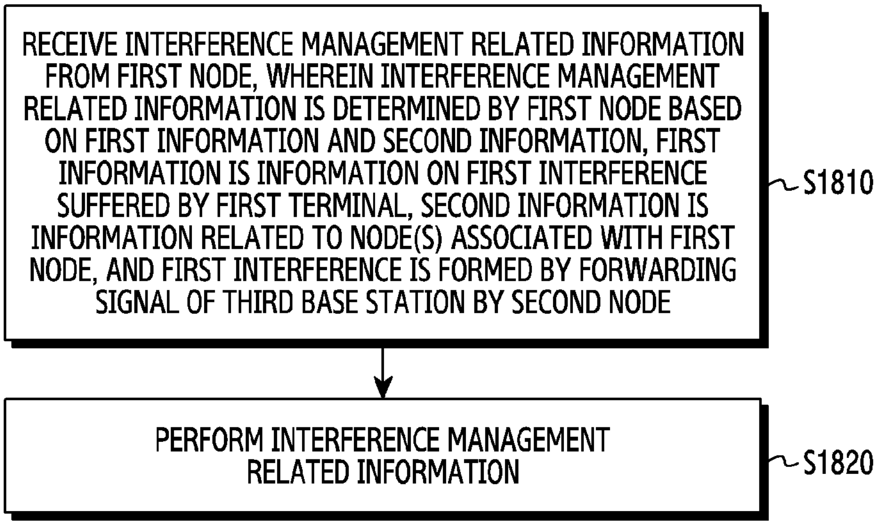
FIG. 18 illustrates a flowchart of a method performed by a third base station according to various embodiments of the present disclosure.

FIG. 18 illustrates a flowchart of a method performed by a third base station according to various embodiments of the present disclosure. In step S1810, the third base station receives interference management related information from a first node, wherein the interference management related information is determined by the first node based on first information and second information, the first information is information on a first interference suffered by a first terminal, the second information is information related to node(s) associated with the first node, and the first interference is formed by forwarding a signal of the third base station by the second node. In step S1820, the third base station performs the interference management related information.

For example, the method further comprises: receiving a first signal from the first terminal and/or sending a second signal to the first terminal, wherein information related to a first measurement of the first signal is used to generate first indication information indicating whether the third base station is an interfering base station for the first terminal, and information related to a second measurement of the second signal is used to generate second indication information indicating whether the third base station is the interfering base station for the first terminal. For example, the method further comprises: in response to configuration of the first node, performing at least one of the following operations: receiving the first signal from the first terminal and measuring the first signal, reporting the measurement result of the first signal to the first node, and sending the second signal to the first terminal. For example, the interference management related information includes at least one of: configuring a beam identification ID of the third base station corresponding to the first interference, and third indication information for indicating the third base station not to send downlink signals on configured beam ID; or configuring a beam identification ID of the third base station corresponding to the first interference, and fourth indication information for indicating the third base station to reduce transmission power for sending downlink signals on configured beam ID. For example, the method further comprises: determining that a condition for performing the interference management related information is not met, after receiving the interference management related information, and sending indication information for indicating that the interference management related information is rejected to the first node.

By employing the method described in connection with FIG. 18 for interference management, the interference to the first terminal formed by forwarding the signal transmitted from the interfering base station by the second node (e.g., relay node) can be reduced/eliminated, thereby improving quality of signal transmission/reception for the first terminal.

Figure 19:
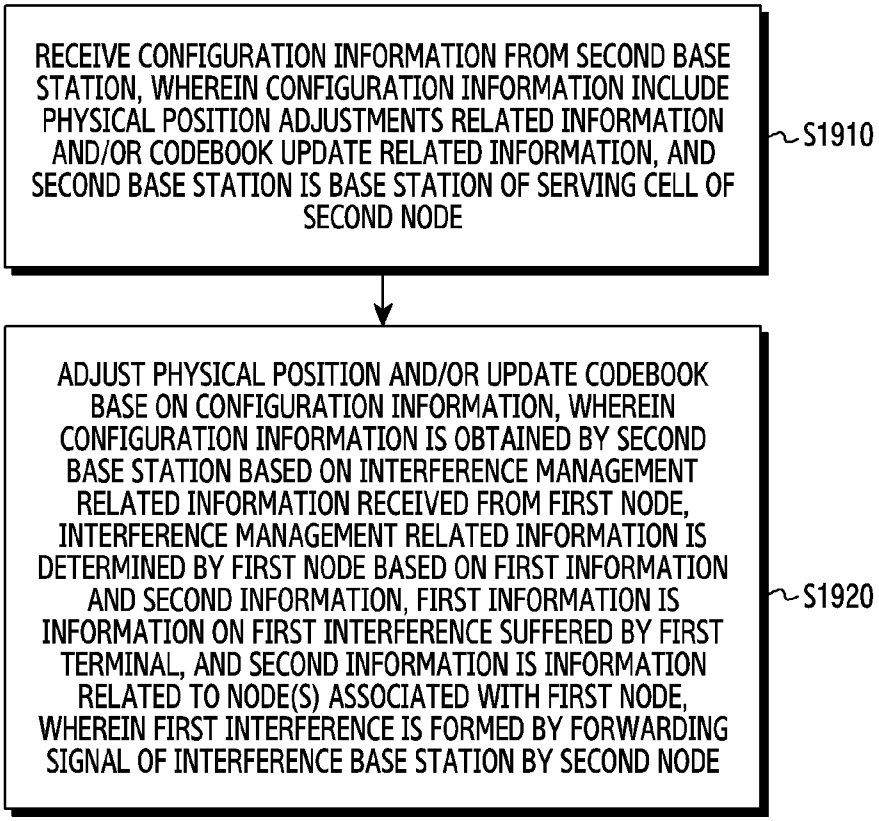
FIG. 19 illustrates a flowchart of a method performed by a second node according to various embodiments of the present disclosure.

FIG. 19 illustrates a flowchart of a method performed by a second node according to various embodiments of the present disclosure. In step S1910, the second node receives configuration information from a second base station, wherein the configuration information includes physical position adjustment related information and/or codebook update related information, and the second base station is a base station of a serving cell of the second node. In step S1920, the second node adjusts physical position and/or updates codebook based on the configuration information. For example, the configuration information is obtained by the second base station based on interference management related information received from a first node, wherein the interference management related information is determined by the first node based on first information and second information, the first information is information on a first interference suffered by a first terminal, and the second information is information related to node(s) associated with the first node. For example, the first interference is formed by forwarding a signal of an interfering base station by the second node.

By employing the method described in connection with FIG. 19 for interference management, the interference to the first terminal formed by forwarding the signal transmitted from the interfering base station by the second node (e.g., relay node) can be reduced/eliminated, thereby improving quality of signal transmission/reception for the first terminal.

The present disclosure also provides an interference management method based on multi-node cooperation (hereinafter referred to as cooperative interference management) for a wireless communication network in which at least one relay device is present, wherein, the wireless communication system to which the interference management method is applied comprises at least one of the following nodes: at least one base station, at least one relay node connected to one or more of the at least one base station, at least one cooperative node, and at least one terminal connected to one or more of the at least one base station.

In this embodiment, the meaning of base station may be a gNB, or a serving cell, or an IAB node. In some examples, the connection relationship between the base station and the relay or between the base station and the terminal may be RRC connection relationship. For example, each of the terminals establishes RRC connection relationship with one of the base stations. For another example, each of the relay nodes (or control modules of the relay nodes) establishes RRC connection relationship with one of the base stations. The cooperative node can perform signaling interaction with respective base stations and/or respective relay nodes and can be a node such as a core network, operation administration and maintenance (OAM), etc., and can configure respective base stations, and/or, can configure the relay nodes through the base stations. In some other examples, one of the at least one cooperative node may be one of the at least one base station, that is, a certain base station node serves as the cooperative node; and the base stations serving as different cooperative nodes may be different, and the different base stations may mean that the base stations belong to different gNBs, and/or the cell IDs corresponding to the base stations are different. In still other examples, each of the base stations has connection relationship with at least one of the cooperative nodes, wherein the relationship at least comprises that the base station connected to the cooperative node sends signaling to the cooperative node and/or receives signaling from the cooperative node, where the signaling is signaling related to the cooperative interference management.

Relay Node

In one implementation, the relay node (for example, a relay node 2003) mainly consists of a control module (for example, a mobile terminal function entity NCR-MT of a network controlled relay) and a signal transmission module (a forward function entity NCR-Fwd of the network controlled relay). The control module and the signal transmission module can be separate entities, or different functions of a same entity. According to configuration signaling received by the control module, the signal transmission module receives an input signal (for example, a signal received by the signal transmission module of the relay node on an access link or a backhaul link) and sends an output signal to a designated forwarding direction (for example, a signal transmitted by the signal transmission module of the relay node on the access link or the backhaul link), wherein the configuration signaling received by the control module comprises a codebook modulation scheme for determining the designated forwarding direction and/or a physical position adjustment scheme of the relay node.

Figure 20A:
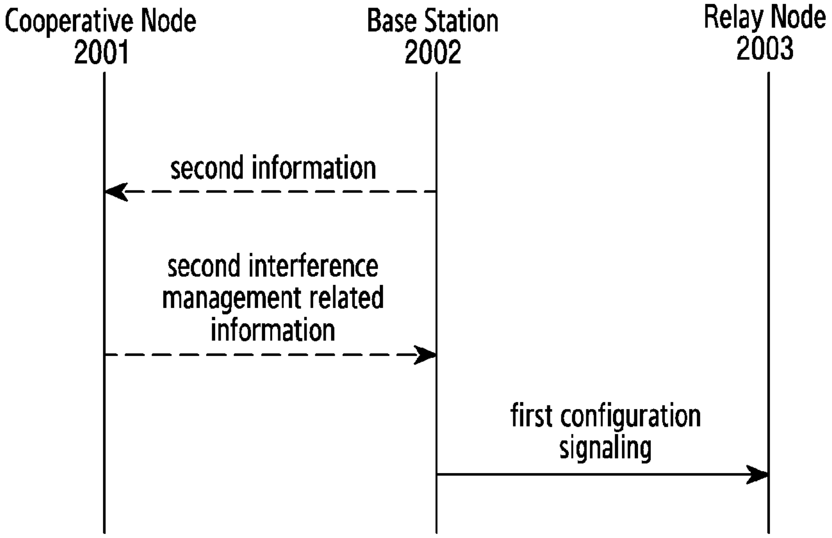
FIG. 20A illustrates a flowchart of a cooperative approach for interference management according to various embodiments of the present disclosure.

The relay node 2003 is connected to a base station 2002 of its serving cell, and receives first configuration signaling sent from the base station 2002 of its serving cell, so as to adjust an output beam state forwarded by the relay node 2003, as shown in FIG. 20A. The first configuration signaling may be calculated by the base station 2002 of the serving cell of the relay node 2003 (hereinafter, may also be referred to as "a serving cell base station of the relay node 2003") based on information of at least one terminals connected to the base station 2002 of the serving cell of the relay node 2003, or the cooperative node 2001 calculates second interference management related information based on the first information and the second information reported by a base station, and sends the information to the base station 2002 of the serving cell of the relay node 2003, so that the base station of the serving cell acquires the first configuration signaling based on the second interference management related information. The base station may be one or more of all base stations within a management range of the cooperative node 2003, and may comprise the base station 2002 of the serving cell of the relay node 2003. The relay node 2003 is configured to adjust output beams, for forwarding output beams of the base station 2002 of its serving cell in a designated direction, to improve quality of communication between the base station 2002 of the serving cell and the terminals, or adjusting the direction of the forwarded output beam of the interfering base station on the premise of ensuring the communication connection with the terminal and the base station 2002 of its serving cell, in order to reduce interference to other terminals.

A signal receiving entity of the control module of the relay node 2003 receives the first configuration signaling, which is used to control the signal transmission module to receive the signal from the base station 2002 of its serving cell and forward the signal to the designated direction (for example, for connecting the base station 4011 and the terminal 4022), to establish a signal path between the terminal and the base station 2002 of its serving cell. The first configuration signaling is related to one or more of a physical position and physical state of the relay node (e.g., height, angle adjustment, etc.), information of the input beam received by the relay node, a geographical position and physical state of the terminal connected to the base station of the serving cell of the relay node through the relay node, and a design scheme of the relay node (e.g., the signal transmission module 4032 of the relay node) (for example, a design scheme of the antenna element, an electromagnetic parameter change curve of an adjustable structure).

Specifically, the first configuration signaling may include at least one of following: physical position adjustment information of the relay node 2003, physical position adjustment indication information of the relay node 2003, codebook information of the relay node 2003, and codebook indication information of the relay node 2003, wherein, the physical position adjustment may specifically be adjustment of the spatial angle of the relay node 2003, adjustment of the spatial position of the relay node 2003, adjustment of the relative positions among sub-modules of the relay node 2003, which can increase the effective area of the relay node 2003 for receiving the input beam, and improve energy transmission efficiency of the output beams of the base station; the codebook information of the relay node 2003 may specifically be adjustment of loaded voltage of each adjustable structure on the signal transmission module of the relay node 2003, which is used to adjust electromagnetic wave output beam information of each unit of the signal transmission module of the relay node 2003 where the beams of the base station 2002 arrives and are forwarded, wherein the base station 2002 is the base station of the serving cell of the relay node 2003, to implement adjustment of the output beam direction of the beam forwarded by the relay node 2003.

The codebook configuration signaling or configuration signaling indicated by the codebook can be used to obtain a precise output beam angle of the relay node 2003, meet requirements of communication with the terminal, and improve the communication quality. Specifically, based on the relative positions of the base station of the serving cell and the relay node 2003, combined with the direction for transmitting beams of the base station of the serving cell and the design of the relay node, information (e.g., phase information) of the input beam of each unit of the signal transmission module of the relay node 2003 where the output beam of the base station of the serving cell arrives can be obtained; based on the terminal physical position calculated by a connection distance between the terminal and the base station of its serving cell and the beam information, combined with the physical position of the relay node 2003, the output beam information of the relay node 2003 required for the output beam of the relay node 2003 to reach the terminal is obtained; based on the input and output beam information, referring to the unit structure, the number of units, and a modulation correspondence between the control module and the electromagnetic effect of the unit of the relay node 2003, the codebook information (or codebook indication information) of the relay node used for beam control is calculated.

A specific method for the relay node 2003 to receive the first configuration signaling may be: the terminal function entity (NCR-MT) of the control module of the relay node 2003 receives the first configuration signaling, wherein, the first configuration signaling is sent by the terminal function entity of the base station 2002 of the serving cell of the relay node 2003, and wherein the first configuration signaling may be at least one of downlink control information, RRC signaling, and MAC layer signaling. And a specific method for acquiring the first configuration signaling may be that the relay node receives the first configuration signaling through the downlink control channel and/or the downlink shared channel.

In some embodiments, the first configuration signaling of the relay node 2003 may be obtained in at least one the following ways: being calculated by the base station 2002 of the serving cell of the relay node 2003 based on information of the relay node 2003 and the terminals connected to the base station 2002 of the serving cell of the relay node 2003; the other nodes send the first configuration signaling to the base station 2002 of the serving cell of the relay node 2003, wherein the other nodes may be the cooperative node for the base station 2002 of the serving cell of the relay node 2003, and the first configuration signaling is related to the second interference management related information, and is used for reducing interference to the target terminal after the downlink transmission signal of the interfering base station is forwarded by the relay node 2003, and wherein the second interference management related information may include at least one of the following: physical position adjustment information or adjustment indication information of a relay node forwarding related entity (e.g., NCR-Fwd), codebook adjustment information or codebook adjustment indication information (for example, voltage codebook corresponding to a phase compensation amount for adjusting each adjustable structure of the relay node) of the forwarding related entity (e.g., NCR-Fwd) of the relay node.

The relay node 2003 can obtain the first configuration signaling in the second interference management related information configured by the cooperative node 2001 through the forwarding of the base station of its serving cell, or the relay node 2003 obtains the first configuration signaling calculated based on the second interference management information from the base station of its serving cell. Wherein, the first configuration signaling calculated based on the second interference management information and obtained by the relay node 2003 from the base station of its serving cell is codebook adjustment information or codebook adjustment indication information required by the relay node 2003, the codebook adjustment information or codebook adjustment indication information is calculated by the base station 2002 of the serving cell of the relay node 2003 based on the physical position adjustment information of the cooperative node 2001 for the relay node 2003 in the second interference management information configured by the cooperative node 2001, in combination with relevant information of the base station of the serving cell, the relay node 2003 and the served terminals.

The second interference management information is calculated by the cooperative node 2001 based on the first information reported by the base station of the serving cell of the target terminal and the second information reported by one or more of all base stations within the management range of the cooperative node, where the first information includes physical position related information of the target terminal (e.g., a beam connected to the base station of its serving cell, relative angle, relative distance) whose transmission information quality is poor due to the beam forwarded by the relay node, identity information of the base station of the serving cell of the target terminal, and communication quality related information of the target terminal; the second information includes identity information of the base stations within the management range of the cooperative node and the relay nodes connected thereto, physical position related information, and codebook information used by the relay node.

If the information that the cooperative node 2001 sends to the base station 2002 of the serving cell of the relay node 2003 is the second interference management related information, the relay node 2003 needs to perform adjustment to the physical position and/or codebook according to the first configuration signaling sent by the base station 2002 of the serving cell, the physical position information is obtained from the cooperative node 2001, and the codebook information may be obtained from the cooperative node 2001 or the base station 2002 of the serving cell of the relay node 2003. If the cooperative node 2001 sends the physical position adjustment information of the relay node 2003 to the base station 2002 of the serving cell of the relay node 2003, the base station 2002 of the serving cell of the relay node 2003 calculates the new codebook information used by the relay node 2003 based on the physical position information and the information of the connected terminal and the relay node. The base station 2002 of the serving cell of the relay node 2003 sends the first configuration signaling (e.g., including the physical adjustment position and codebook information) to the relay node 2003 to eliminate interference to the target terminal and maintain connection with the terminal communicating through the relay node 2003; the updated second information (e.g., containing the codebook information) is sent to the cooperative node 2003 for subsequent interference management.

Figure 20B:
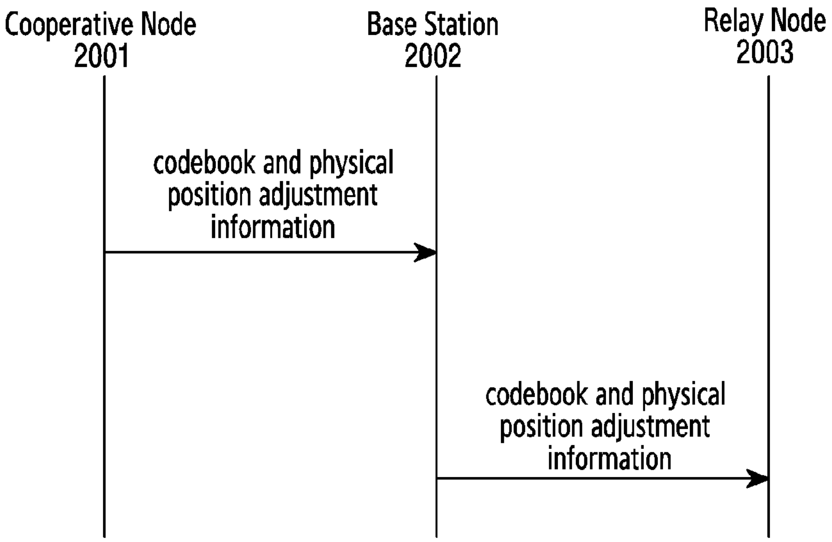
FIG. 20B illustrates a flowchart of a cooperative approach for interference management according to various embodiments of the present disclosure.
Figure 20C:
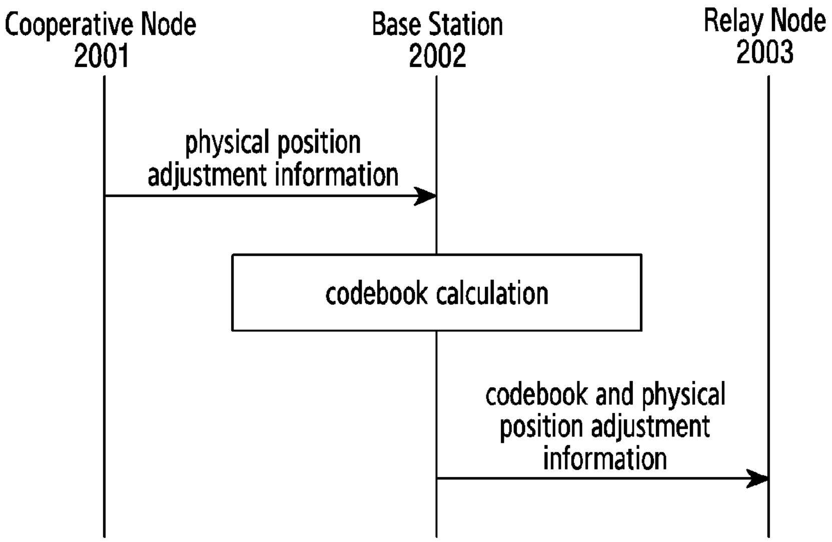
FIG. 20C illustrates a flowchart of a cooperative approach for interference management according to various embodiments of the present disclosure.
Figure 20D:
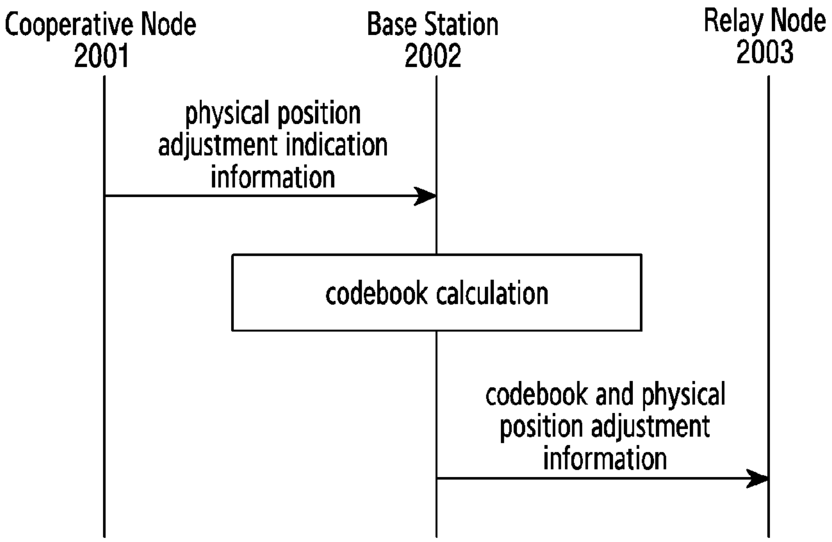
FIG. 20D illustrates a flowchart of a cooperative approach for interference management according to various embodiments of the present disclosure.

FIGS. 20B to 20D illustrate flowcharts of cooperative approaches for interference management according to various embodiments of the present disclosure. The method of obtaining the first configuration signaling for the relay node shown in FIGS. 20B to 22D is explained, where the first configuration signaling may include codebook adjustment information and physical position adjustment information for the relay node 2003. In FIG. 20B, the first configuration signaling for the relay node 2003 is calculated and obtained by the cooperative node 2001 and is directly forwarded from the cooperative node 2001 to the relay node 2003 by the base station 2002 of the serving cell of the relay node 2003. In FIG. 20C, the physical position adjustment information for the relay node 2003 is calculated and obtained by the cooperative node 2001. The base station 2002 of the serving cell of the relay node 2003 determines the first configuration signaling for the relay node 2003, based on the physical position adjustment information obtained from the cooperative node 2001 and the codebook information used by the relay node 2003 (or information on a terminal connected through the relay node 2003). In FIG. 20D, the physical position adjustment indication information for the relay node 2003 is calculated and obtained by the cooperative node 2001. The base station 2002 of the serving cell of the relay node 2003 obtains specific physical position adjustment information based on the physical position adjustment indication information obtained from the cooperative node 2001, and based on a combination of the specific physical position adjustment information and the codebook information used by the relay node 2003 (or the information on the terminal connected through the relay node 2003), determines the first configuration signaling for the relay node 2003.

Interfering Base Station

In one implementation, when the communication quality-related information received by the base station of the serving cell and sent by the target terminal communicating therewith is less than a specific threshold, the "first information" (e.g., containing the physical position related information of the target terminal and the base station of the serving cell of the target terminal) is reported to the cooperative node 2001 to request interference management for the target terminal. Determination of the interfering base station (or second base station) of the target terminal is completed by the cooperative node 2001; with reference to the first information and the second information reported by the base station, it is determined by comparing the beam direction of the output beam of the base station within the management range forwarded by the relay node with the position of the target terminal, where the base station may be one or more of all base stations within the management range of the cooperative node 2001, and may comprise the base station 2002 of the serving cell. Where the "second information" is sent to the cooperative node by the base station within the management range of the cooperative node, includes the identity information of the base station and the relay node connected thereto, the geographical position related information, and the codebook information used by the relay node. The method for determining the interfering base station can comprises: determining whether the base station within the management range of the cooperative node is the interfering base station, and/or, setting a sequence for determining the interfering base station until several eligible interfering base stations are obtained (for example, they can be sorted according to the distance between the base station and the target terminal).

Figure 21A:
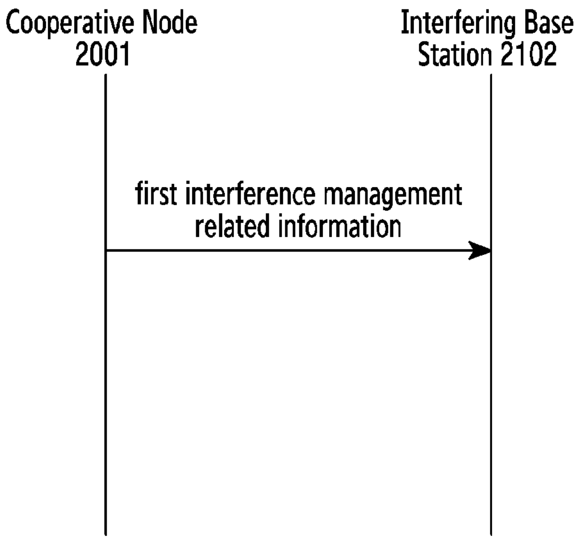
FIG. 21A illustrates a flowchart of a cooperative approach for interference management according to various embodiments of the present disclosure.
Figure 21B:
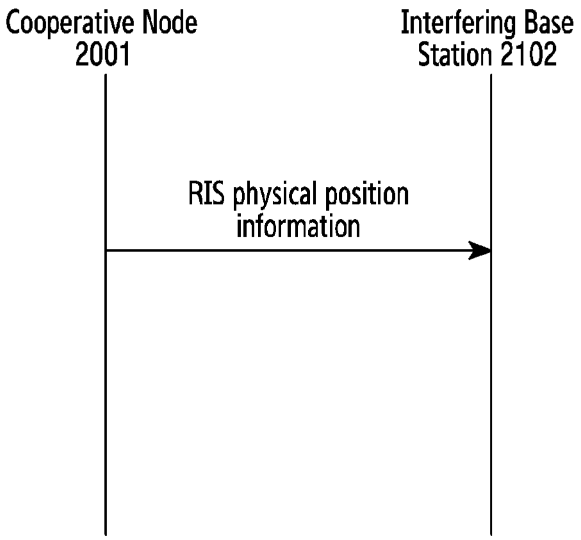
FIG. 21B illustrates a flowchart of a cooperative approach for interference management according to various embodiments of the present disclosure.
Figure 21C:
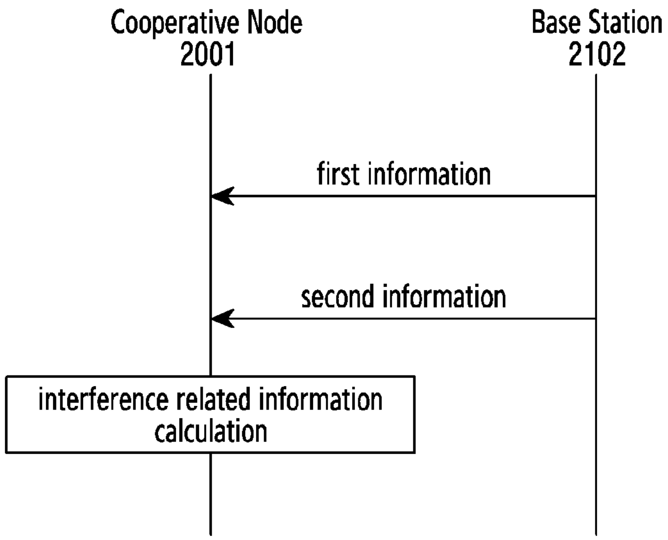
FIG. 21C illustrates a flowchart of a cooperative approach for interference management according to various embodiments of the present disclosure.

The interfering base station adjusts the output beam indication information used by the base station and its output power according to the received first interference management related information calculated and configured by the cooperative node, so as to reduce impact of the interfering base station on the target terminal, as shown in FIG. 21A. FIGS. 21A to 21C are flowcharts illustrating cooperative approaches for interference management according to various embodiments of the present disclosure.

The first interference management related information may include at least one of the following:

Beam indication information that is not preferred during downlink transmission of the interfering base station 2102;

Beam indication information for reducing the output power during downlink transmission of the interfering base station 2102;

Physical position information of the relay node for forwarding the signal that causes interference to the target terminal; and Downlink beam indication information in which the interfering base station 2102 is configured to reduce the output power in downlink, and downlink transmission power reduction offset.

As shown in FIG. 21B, in some examples, the interfering base station 2102 may calculate information of the downlink beam direction that affects the communication of the target terminal, according to the physical position information of the relay node sent by the relay node, combined with the physical position information of the interfering base station stored by the interfering base station.

The interfering base station 2102 adjusts the direction of the output beam and/or the output power value in the designated direction according to the received first interference management related information, so as to reduce the interference to the target terminal.

Cooperative Node

In one implementation, the cooperative node 2001 obtains the second information reported by a base station within its management range, and the content of the second information comprises information related to the base station itself and information related to a relay node connected to the base station. A method for obtaining the information may be at least one of the following: the base station sends the information to the cooperative node 2001 through an uplink channel, such as an uplink broadcast channel; the information is pre-stored by other nodes, such as operation administration and maintenance (OAM), and delivered to the cooperative node 2001; the information is pre-stored in the cooperative node 2001, and obtained by searching through the indication information reported by the base station. The second information may comprise at least one of the following: identity information of the base station and the relay node 2003 (such as the ID or identity code of the base station), connection relationship information between the relay node 2003 and the base station (such as the correspondence between identity codes of the base station and the relay node), physical position information of the base station and the relay node 2003 (such as geographical position coordinates, erection height), physical state information of the base station and the relay node 2003 (such as pitch angle, rotation angle), and configuration signaling of the relay node 2003 (such as codebook information, physical state adjustment information).

Wherein, the cooperative node 2001 can obtain the identity information of the base station and the relay node 2003 connected thereto, which is used to confirm the physical position information of the base station and the relay node 2003, and send the interference management related information to a designated base station; the cooperative node 2001 can obtain the first configuration signaling of the base station 2002 of the serving cell of the relay node 2003 for the relay node 2003, through the base station 2003 of the serving cell of the relay node 2003, the first configuration signaling is used for interference source calculation, where the configuration signaling contains codebook indication information and physical position adjustment information, and the configuration signaling can change a propagation direction of the beam output from the base station 2002 of the serving cell of the relay node 2003 after the signaling reaches the relay node 2003 and is forwarded by the relay node 2003; the cooperative node 2001 can obtain the physical state adjustment information of the base station 2002 of the serving cell of the relay node 2003, for interference management calculation, where the physical state adjustment of the base station can change the range of the base station of the base station serving cell and the direction/angle of the output beam; the cooperative node 2001 can obtain the corresponding relationship between the base station and the relay node 2003, for sending interference management related information to the relay node 2003 through the base station 2002 of the serving cell of the relay node 2003, to adjust the state of the relay node 2003. If the second information changes, the base station in which changes occur or the base station of the serving cell connected to the relay node in which changes occur need to send the changed second information to the cooperative node.

The cooperative node 2001 confirms, according to the first information reported by the base station within the management range, whether to perform interference management with respect to the target terminal served by the reporting base station. The calculation of the interference management needs to combine the first information and the second information reported by the base station to obtain information related to possible interfering base stations and interfering beam directions, as shown in FIG. 21C. Wherein, based on the first information reported by the base station of the serving cell of the target terminal, the physical position related information of the target terminal can be obtained; in combination with the second information reported by all base stations within the management range of the cooperative node 2001, the cooperative node 2001 can obtain the relative distances and angles between the target terminal and multiple base stations and between the target terminal and the relay node 2003. The direction of downlink beam of any base station reaching the relay node 2003 can be determined by the physical positions of the base station and the relay node 2003, in combination with the first configuration signaling obtained by the relay node 2003, a direction of the downlink beam of any base station except the base station of the serving cell of the target terminal being enhanced after being forwarded by the relay node 2003 can be obtained. If the direction of the output beam of the base station overlaps with the target terminal, the base station is considered to be the interfering base station of the target terminal; if the direction of the output beam of the base station does not overlap with the target terminal, the base station is considered not to be the interfering base station of the target terminal.

An order in which the cooperative node calculates possible interfering base stations can be: determining whether all base stations within the management range of the cooperative node except the base station of the serving cell of the target terminal meet the above requirements, and/or, setting a sequence for determining the interfering base station until several interfering base stations satisfying requirements are obtained (for example, the at least one third base station can be sorted according to the distance between the at least one third base station and the target terminal, to determine whether the at least one third base station is the interfering base station).

In some examples, the transmission environment of a millimeter wave frequency is complex, and consistency between the determination result and the actual transmission channel is unknown, therefore a step for verifying the interfering base station can be added. Specifically, the cooperative node 2001 may send a configuration signal to the base station of the serving cell of the target terminal and/or one or more possible interfering base stations, so that the target terminal and/or the one or more possible interfering base stations perform transmission, reception, measurement and result feedback of an interference verification signal, and the cooperative node 2001 may configure the corresponding base station to report the verification measurement data and/or measurement result to the cooperative node 2001. If the cooperative node 2001 configures that a possible interfering base station sends a verification signal, then the base station of the serving cell of the target terminal is configured to forward the reception of the target terminal, measure the verification signal and report the measurement result configuration information to the connected target terminal, receive the measurement data and/or measurement result reported by the target terminal, and send the measurement data and/or measurement result reported by the target terminal to the cooperative node 2001; the target terminal is configured by the base station of its serving cell to receive and measure the verification signal and report the measurement result to the base station of its serving cell.

Alternatively, if the cooperative node 2001 configures that the interfering base station receives and measures the verification signal and report the measurement result to the cooperative node 2001; then the base station of the serving cell of the target terminal is configured to forward configuration information of the cooperative node 2001 to the target node, wherein the configuration information indicates that the verification signal may be sent by the target terminal. If a strength of the verification signal (such as SSB, zero power DMRS, SRS signal) received by the receiving node (the interfering base station and/or target terminal) configured by the cooperative node 2001 satisfies a specified condition (for example, a receive power being greater than channel noise), then it is determined that the interfering base station receiving/transmitting the verification signal is the interfering base station of the terminal (hereinafter referred to as the second base station); if the received verification signal does not satisfy the above condition, it is determined that the interfering base station receiving/transmitting the verification signal is not the interfering base station of the terminal.

The determination and comparison of the reception result of the verification signal can be performed at the interfering base station, the target terminal, the base station of the serving cell of the target terminal, and the cooperative node 2001, and the condition for the determination can be configured by other higher layers (e.g., the RRC layer, MAC layer), or is obtained through calculation by the cooperative node 2001, the base station, the interfering base station 2102, the target terminal, and the base station of the serving cell of the target terminal, according to hardware devices and transmission parameters of the system.

Based on the first information and/or the second information reported by the base station, the cooperative node 2001 sends the first interference management related information and/or the second interference management related information to the second base station and/or the base station connected to the relay node 2003 forwarding the interference signal (e.g., the base station 2002 of the serving cell of the relay node 2003) to reduce the impact of the second base station to the target terminal.

The cooperative node 2001 sends the first interference management related information to the second base station, so as to reduce the impact of the second base station on the target terminal. The first interference management related information may include at least one of the following:

Indication information for avoiding downlink transmission of second base station and beam direction information of the downlink transmission of second base station;

Indication information for reducing output power of downlink transmission of the second base station, beam direction information of downlink transmission of the second base station, and a reduction offset amount of downlink transmission power when the interfering base station performs downlink transmission with the downlink beam configured to reduce the output power;

Indication information for avoiding downlink transmission of second base station and physical position information of the relay node; and Indication information for reducing power of downlink transmission of the second base station, physical position information of the relay node, and a reduction offset amount of downlink transmission power when the interfering base station performs downlink transmission with the downlink beam configured to reduce the output power.

Wherein, the second base station may calculate information related to the direction of its downlink beam that affects communication of the target terminal, based on the physical position information of the relay node sent by the relay node 2003, in combination with the physical position information of the second base station stored by the second base station.

The cooperative node 2001 sends the second interference management related information to the base station 2002 of the serving cell of the relay node 2003 that forwards the signal of the interfering base station and affects the communication quality of the target terminal, so as to reduce the interference caused to the target terminal by the downlink transmission signal of the second base station after the downlink transmission signal of the second base station is forwarded by the relay node 2003. In some examples, the specific method for the cooperative node 2001 to send the second interference management related information to the relay node 2003 that forwards the signal of the interfering base station and affects the communication quality of the target terminal may be that: when the cooperative node 2001 is not the first base station, that is, when the cooperative node 2001 is not the relay node 2003 or the base station of the serving cell of the terminal function entity of the relay node 2003, the cooperative node 2001 sends the second interference management related information to the first base station; when the cooperative node 2001 is the first base station, that is, when the cooperative node 2003 is the relay node 2003 or the base station of the serving cell of the terminal functional entity of the relay node 2003, the cooperative node 2001 sends the second interference management related information to the relay node 2003.

And, when the cooperative node 2001 is not the first base station, after receiving the second interference management related information, the first base station sends the second interference management related information to the relay node 2003 or the terminal functional entity of the relay node 2003. In some examples, the second interference management related information may comprise at least one of the following: physical position indication or adjustment information of the forwarding related entity (e.g., RIS panel, RF panel) of the relay node 2003, codebook indication or adjustment information (for example, voltage codebook corresponding to a phase compensation amount for adjusting each unit of the RIS panel). Based on the physical position indication or adjustment information of the forwarding related entity of the relay node 2003 in the second interference management related information, in combination with the terminal information of the serving cell of the relay node 2003 and/or the configuration signaling of the relay node, the codebook indication or adjustment information is calculated.

If the calculation of the codebook indication or adjustment information is completed by the cooperative node 2001, the cooperative node 2001 sends the second interference management related information containing the physical position indication or adjustment information and the codebook indication or adjustment information of the forwarding related entity of the relay node 2003 to the terminal functional entity of the relay node 2003 through the base station 2002 of the serving cell of the relay node 2003; if the calculation of the codebook indication or adjustment information is completed by the base station 2002 of the serving cell of the relay node 2003, the cooperative node 2001 sends the second interference management related information including the physical position indication or adjustment information of the forwarding related entity of the relay node 2003 to the base station 2002 of the serving cell of the relay node 2003, then the base station 2002 of the serving cell of the relay node 2003 calculates the codebook indication or adjustment information in combination with said information and sends the physical position indication or adjustment information of the forwarding related entity as required by the cooperative node 2001 and the calculated codebook indication or adjustment information to the terminal functional entity of the relay node 2003, and the cooperative node 2001 obtains the calculated codebook indication or adjustment information from the base station 2002 of the serving cell of the relay node 2003 for subsequent interference management.

Figure 22:
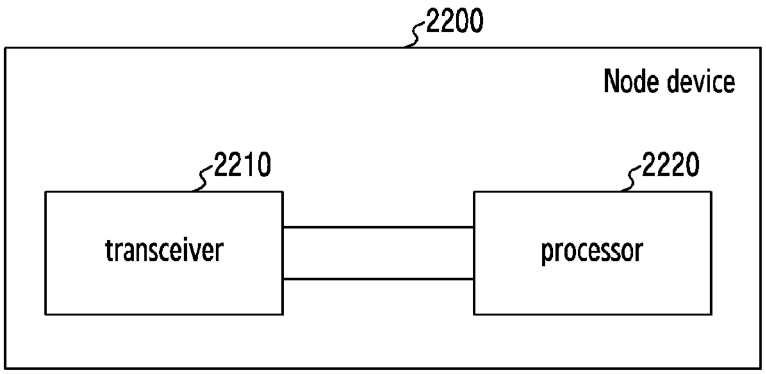
FIG. 22 illustrates a block diagram of a node device according to various embodiments of the present disclosure.

FIG. 22 illustrates an example of a node device 2200 according to various embodiments of the present disclosure.

Referring to FIG. 22, the node device 2200 includes a transceiver 2210 and a processor 2220. The transceiver 2210 is configured to transmit and receive data/signals. The processor 2220 is configured to control the transceiver 2210 to perform various methods of the present disclosure or any combination of one or more steps of each method. The node device 2200 may be implemented in software, hardware, firmware, or a combination thereof. The node device 2200 may be a UE, an access network node, or a core network node, etc.

Figure 23:
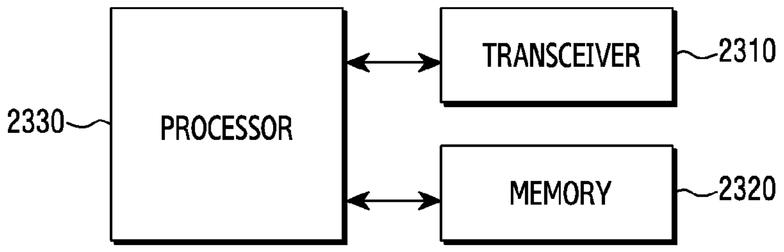
FIG. 23 illustrates a block diagram of a terminal (or, user equipment) according to various embodiments of the present disclosure.

FIG. 23 illustrates a block diagram of a terminal (or, user equipment) according to various embodiments of the present disclosure.

As shown in FIG. 23, the UE according to an embodiment may include a transceiver 2310, a memory 2320, and a processor 2330. The transceiver 2310, the memory 2320, and the processor 2330 of the UE may operate according to a communication method of the UE described above. However, the components of the UE are not limited thereto. For example, the UE may include more or fewer components than those described above. In addition, the processor 2330, the transceiver 2310, and the memory 2320 may be implemented as a single chip. Also, the processor 2330 may include at least one processor. Furthermore, the UE of FIG. 23 corresponds to the UEs of FIG. 1.

The transceiver 2310 collectively refers to a UE receiver and a UE transmitter, and may transmit/receive a signal to/from a base station or a network entity. The signal transmitted or received to or from the base station or a network entity may include control information and data. The transceiver 2310 may include a RF transmitter for up-converting and amplifying a frequency of a transmitted signal, and a RF receiver for amplifying low-noise and down-converting a frequency of a received signal. However, this is only an example of the transceiver 2310 and components of the transceiver 2310 are not limited to the RF transmitter and the RF receiver.

Also, the transceiver 2310 may receive and output, to the processor 2330, a signal through a wireless channel, and transmit a signal output from the processor 2330 through the wireless channel.

The memory 2320 may store a program and data required for operations of the UE. Also, the memory 2320 may store control information or data included in a signal obtained by the UE. The memory 2320 may be a storage medium, such as read-only memory (ROM), random access memory (RAM), a hard disk, a CD-ROM, and a DVD, or a combination of storage media.

The processor 2330 may control a series of processes such that the UE operates as described above. For example, the transceiver 2310 may receive a data signal including a control signal transmitted by the base station or the network entity, and the processor 2330 may determine a result of receiving the control signal and the data signal transmitted by the base station or the network entity.

Figure 24:
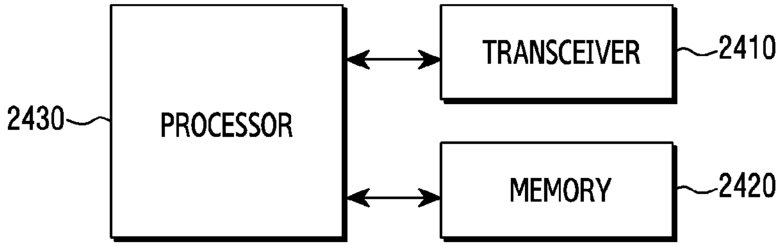
FIG. 24 illustrates an example of a base station according to various embodiments of the present disclosure.

FIG. 24 illustrates a block diagram a base station according to various embodiments of the present disclosure.

As shown in FIG. 24, the base station according to an embodiment may include a transceiver 2410, a memory 2420, and a processor 2430. The transceiver 2410, the memory 2420, and the processor 2430 of the base station may operate according to a communication method of the base station described above. However, the components of the base station are not limited thereto. For example, the base station may include more or fewer components than those described above. In addition, the processor 2430, the transceiver 2410, and the memory 2420 may be implemented as a single chip. Also, the processor 2430 may include at least one processor. Furthermore, the base station of FIG. 20 corresponds to the BAs of FIG. 1.

The transceiver 2410 collectively refers to a base station receiver and a base station transmitter, and may transmit/receive a signal to/from a terminal (UE) or a network entity. The signal transmitted or received to or from the terminal or a network entity may include control information and data. The transceiver 2410 may include a RF transmitter for up-converting and amplifying a frequency of a transmitted signal, and a RF receiver for amplifying low-noise and down-converting a frequency of a received signal. However, this is only an example of the transceiver 2410 and components of the transceiver 2410 are not limited to the RF transmitter and the RF receiver.

Also, the transceiver 2410 may receive and output, to the processor 2430, a signal through a wireless channel, and transmit a signal output from the processor 2430 through the wireless channel.

The memory 2420 may store a program and data required for operations of the base station. Also, the memory 2420 may store control information or data included in a signal obtained by the base station. The memory 2420 may be a storage medium, such as read-only memory (ROM), random access memory (RAM), a hard disk, a CD-ROM, and a DVD, or a combination of storage media.

The processor 2430 may control a series of processes such that the base station operates as described above. For example, the transceiver 2410 may receive a data signal including a control signal transmitted by the terminal, and the processor 2430 may determine a result of receiving the control signal and the data signal transmitted by the terminal.

The methods according to the embodiments described in the claims or the detailed description of the present disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described in the claims or the detailed description of the present disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to various embodiments of the present disclosure. Another storage device on the communication network may also be connected to the apparatus performing the embodiments of the present disclosure.

In the afore-described embodiments of the present disclosure, elements included in the present disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

At least some of the example embodiments described herein may be constructed, partially or wholly, using dedicated special-purpose hardware. Terms such as "component," "module" or "unit" used herein may include, but are not limited to, a hardware device, such as circuitry in the form of discrete or integrated components, a field programmable gate array (FPGA) or application specific integrated circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent, or similar purpose, unless expressly stated otherwise. Thus, unless expressly stated otherwise, each feature disclosed is one example only of a generic series of equivalent or similar features.

The present disclosure is not restricted to the details of the foregoing embodiment(s). The present disclosure extends to any novel one, or any novel combination, of the features disclosed in this specification (including any accompanying claims, abstract and drawings), or to any novel one, or any novel combination, of the steps of any method or process so disclosed.

Any of the above variation embodiments can be utilized independently or in combination with at least one other variation embodiment. The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

A description of an embodiment with several components in communication with each other does not imply that all such components are required. On the contrary a variety of optional components are described to illustrate the wide variety of possible embodiments of the disclosure.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The specification has described a method and apparatus for selecting a selective security mode for applying selective security and flow management for selective security for user equipment (UE) under mobility. Further, the specification has described a method and apparatus for flow management for selective security during the handover. The illustrated steps are set out to explain the embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What has been described above is only the specific implementation of the present disclosure, but the scope of protection of the present disclosure is not limited thereto. Anyone who is familiar with this technical field may make various changes or substitutions within the technical scope disclosed in the present disclosure, and these changes or substitutions should be covered within the scope of protection of the present disclosure. Therefore, the scope of protection of the present disclosure should be based on the scope of protection of the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a cooperative first node in a wireless communication system, the method comprising:

acquiring first information associated with a terminal and second information related to a node, wherein the first information includes position information of the terminal and the node is associated with the cooperative node;

determining interfering base station related information and interference management information, based on the first information and the second information, wherein an interference is associated with, a signal from the interfering base station to the terminal via a relay node; and transmitting, to a second base station and the interfering base station, the interference management information including beam indication information and position information of the relay node, wherein the relay node includes a reconfigurable intelligent surface (RIS) and is connected to the second base station.

2. The method of claim 1, wherein the node associated with the cooperative node includes at least one of the relay node, a first base station, the second base station, or a third base station, wherein the first base station is associated with a serving cell of the terminal, and wherein the third base station includes the interfering base station.

3. The method of claim 1, wherein the first information includes at least one of: identification information of a first base station associated with a serving cell of the terminal, information related to downlink beams sent by the first base station and received by the terminal, distance information between the terminal and the first base station, or information related to quality of signals received by the terminal.

4. The method of claim 1, wherein the second information includes at least one of: physical position information of the node or codebook information of the relay node.

5. The method of claim 2, wherein determining of the interfering base station related information based on the first information and the second information comprises:

determining, based on the second information, a transmission path for a signal from the third base station and forwarded by the relay node; and determining that the third base station is the interfering base station for the first terminal when the transmission path for the signal passes through the terminal.

6. The method of claim 5, further comprising:

acquiring first measurement information on a first signal sent by the first terminal to the third base station and determining whether the third base station is the interfering base station for the terminal based on the first measurement information;

receiving first indication information indicating whether the third base station is the interfering base station for the terminal, wherein whether the third base station is the interfering base station for the terminal is determined based on the first measurement information by the terminal on the first signal sent from the third base station;

acquiring second measurement information on a second signal sent by the third base station to the terminal and determining whether the third base station is the interfering base station for the terminal based on the second measurement information; or receiving second indication information indicating whether the third base station is the interfering base station for the terminal, wherein whether the third base station is the interfering base station for the terminal is determined based on the second measurement information by the third base station on the second signal sent from the terminal;

performing configuring the terminal to send the first signal to the third base station through the first base station or configuring the third base station to measure the first signal; or performing configuring the third base station to send the second signal to the first terminal or configuring the terminal to measure the second signal through the first base station.

7. The method of claim 1, wherein transmitting the interference management information to the interfering base station comprises at least one of:

configuring a beam identification (ID) of the interfering base station corresponding to the interference and third indication information indicating the interfering base station not to send downlink signals on configured beam ID; or configuring the beam ID of the interfering base station corresponding to the interference and fourth indication information indicating the interfering base station to reduce transmission power for transmitting downlink signals on the configured beam ID.

8. The method of claim 1, wherein transmitting the interference management information to the second base station comprises:

configuring physical position adjustment information for the relay node through the second base station, and acquiring an updated codebook for the relay node to perform assistance communication for the terminal through the relay node, the updated codebook being determined based on the physical position adjustment information.

9. A method performed by a terminal in a wireless communication system, the method comprising:

performing measurement on a received signal; and reporting a measurement result to a first base station, wherein first information is obtained based on the measurement result, the first information is used to determine interfering base station related information and interference management information for an interference to the terminal by a cooperative node, and the first base station is associated with a serving cell of the terminal, and wherein the interference is associated with a signal from the interfering base station to the terminal via a relay node including a reconfigurable intelligent surface (RIS), wherein the interference management information includes beam indication information and position information of the relay node.

10. The method of claim 9, wherein the first information includes at least one of: identification information of the first base station, information related to downlink beams sent by the first base station and received by the terminal, distance information between the terminal and the first base station, or information related to quality of signals received by the terminal, and wherein the first base station is associated with a serving cell of the terminal.

11. A cooperative node in a wireless communication system, the cooperative node comprising:

at least one transceiver; and at least one processor communicatively coupled with the transceiver; and wherein the at least one processor causes the cooperative node to:

acquire first information associated with a terminal, and second information related to a node, wherein the first information includes position information of the terminal and the node is associated with the cooperative node, determine, interfering base station related information and interference management information based on the first information and the second information, wherein an interference is associated with a signal from the interfering base station to the terminal via a relay node, and transmit, to a second base station and the interfering base station, the interference management information including beam indication information and position information of the relay node, wherein the relay node includes a reconfigurable intelligent surface (RIS) and is connected to the second base station.

12. The cooperative node of claim 11, wherein the node associated with the cooperative node includes at least one of the relay second node, a first base station, the second base station, or a third base station, wherein the first base station is associated with a serving cell of the terminal, and wherein the third base station includes the interfering base station.

13. The cooperative node of claim 11, wherein the first information includes at least one of identification information of a first base station associated with a serving cell of the terminal, information related to downlink beams sent by the first base station and received by the terminal, distance information between the terminal and the first base station, or information related to quality of signals received by the terminal.

14. The cooperative node of claim 11, wherein the second information includes at least one of: physical position information of the node or codebook information of the relay node.

15. The cooperative node of claim 12, wherein the at least one processor further causes the cooperative node to:

determine, based on the second information, a transmission path for a signal from the third base station and forwarded by the relay node; and determine that the third base station is the interfering base station for the first terminal, when the transmission path for the signal passes through the terminal.

16. The cooperative node of claim 15, wherein the at least one processor further causes the cooperative node to:

acquire first measurement information on a first signal sent by the terminal to the third base station, and determining whether the third base station is the interfering base station for the terminal based on the first measurement information;

receive first indication information indicating whether the third base station is the interfering base station for the terminal, wherein whether the third base station is the interfering base station for the terminal is determined based on the first measurement information by the terminal on the first signal sent from the third base station;

acquire second measurement information on a second signal sent by the third base station to the terminal and determining whether the third base station is the interfering base station for the terminal based on the second measurement information;

receive second indication information indicating whether the third base station is the interfering base station for the terminal, wherein whether the third base station is the interfering base station for the terminal is determined based on the second measurement information by the third base station on the second signal sent from the terminal;

perform an operation to configure the terminal to send the first signal to the third base station through the first base station, or configuring the third base station to measure the first signal; or perform an operation to configure the third base station to send the second signal to the terminal, and/or configuring the terminal to measure the second signal through the first base station.

17. The cooperative node of claim 11, wherein the at least one processor further causes the cooperative node to:

configure a beam identification (ID) of the interfering base station corresponding to the interference and third indication information indicating the interfering base station not to send downlink signals on configured beam ID; or configure the beam ID of the interfering base station corresponding to the interference, and fourth indication information indicating the interfering base station to reduce transmission power for transmitting downlink signals on the configured beam ID.

18. The cooperative node of claim 11, wherein the at least one processor further causes the cooperative node to:

configure physical position adjustment information for the relay node through the second base station; and acquire an updated codebook for the relay node to perform assistance communication for the terminal through the relay node, the updated codebook being determined based on the physical position adjustment information.

19. A terminal in a wireless communication system, the first terminal comprising:

at least one transceiver;

at least one processor communicatively coupled to the at least one transceiver; and at least one memory, communicatively coupled to the at least one processor, storing instructions executable by the at least one processor individually or in any combination to cause the terminal to:

perform measurement on a received signal, and report a measurement result to a first base station, wherein first information is obtained based on the measurement result, the first information is used to determine interfering base station related information and interference management information for an interference to the terminal by a cooperative node, and the first base station is associated with a serving cell of the terminal, and wherein the interference is associated with a signal from the interfering base station to the terminal via a relay node including a reconfigurable intelligent surface (RIS), wherein the interference management information includes beam indication information and position information of the relay node.

20. The terminal of claim 19, wherein the first information includes at least one of; identification information of the first base station, information related to downlink beams sent by the first base station and received by the terminal, distance information between the terminal and the first base station, or information related to quality of signals received by the terminal, and wherein the first base station is associated with a serving cell of the terminal.

* * * * *